US012521843B2

(12) United States Patent
Omry et al.

(10) Patent No.: US 12,521,843 B2
(45) Date of Patent: *Jan. 13, 2026

(54) VISE

(71) Applicant: The Stanley Works Israel Ltd., Rosh Ha'Ayin (IL)

(72) Inventors: Adar Omry, Hertzeliya (IL); Miki Birnbaum, Rishon le Zion (IL)

(73) Assignee: The Stanley Works Israel Ltd., Rosh Ha'Ayin (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/207,847

(22) Filed: Jun. 9, 2023

(65) Prior Publication Data

US 2023/0311275 A1 Oct. 5, 2023

Related U.S. Application Data

(63) Continuation of application No. 16/986,583, filed on Aug. 6, 2020, now Pat. No. 11,717,940.

(60) Provisional application No. 62/889,299, filed on Aug. 20, 2019.

(51) Int. Cl.
*B25B 1/10* (2006.01)
*B25B 1/02* (2006.01)

(52) U.S. Cl.
CPC ................ *B25B 1/103* (2013.01); *B25B 1/02* (2013.01)

(58) Field of Classification Search
CPC .. B25B 5/10; B25B 5/102; B25B 5/12; B25B 5/125; B25B 5/02; B25B 1/14; B25B 13/03
USPC ...................... 269/38, 44, 53, 71, 72, 73, 74
See application file for complete search history.

(56) References Cited

U.S. PATENT DOCUMENTS

| | | | | |
|---|---|---|---|---|
| 7,036,807 B1 * | 5/2006 | Gasparyan | B25B 1/125 | 269/181 |
| 11,717,940 B2 * | 8/2023 | Omry | B25B 1/125 | 269/240 |
| 2002/0185800 A1 * | 12/2002 | Duncan | B25B 1/103 | 269/242 |
| 2017/0008155 A1 * | 1/2017 | Hanlon | B25B 1/2489 | |

FOREIGN PATENT DOCUMENTS

| | | | |
|---|---|---|---|
| WO | WO-2010062813 A1 * | 6/2010 | B25B 1/125 |

* cited by examiner

*Primary Examiner* — David S Posigian
*Assistant Examiner* — Tyler James McFarland
(74) *Attorney, Agent, or Firm* — Mintz, Levin, Cohn, Ferris, Glovsky and Popeo, P.C. US

(57) ABSTRACT

The present invention relates to a novel vise that operates in both a threaded and unthreaded mode. The vise includes a fixed block, a movable head, a rod, a ratchet mechanism, a threaded mechanism and a toggle mechanism. In the threaded mode, the movable head may only be moved by rotating the rod. In the unthreaded mode, the movable head may only be moved by applying force to the movable head in the desired direction of movement.

18 Claims, 30 Drawing Sheets

VISE

CROSS-REFERENCE TO RELATED APPLICATIONS

This application claims priority to U.S. patent application Ser. No. 16/986,583 filed Aug. 6, 2020, which claims priority to U.S. Provisional Patent Application Ser. No. 62/889,299 filed Aug. 20, 2019, both of which are incorporated herein by reference in their entireties.

FIELD OF THE INVENTION

The present invention relates to a vise. More specifically the invention relates to a vise having a mechanism wherein an operator can selectively move the movable head in a threaded mode or an unthreaded mode.

BACKGROUND OF THE INVENTION

The general concept of a vise is well known. Typically, they are configured to secure an object in place and allow an operator to work on said object in a hands-free manner.

Vises typically include a fixed jaw and a movable jaw. A moveable head is often connected to the fixed block by a threaded mechanism or screw. By applying rotational force to the threaded mechanism, an operator can move position the movable jaw such that it holds an object between the movable and fixed jaw. The application of rotational force to the threaded mechanism is often a time-consuming task because the threaded mechanism often has a very small diameter in comparison to the distance that the movable jaw has to traverse. It would be advantageous to have a vise that allow the movable jaw to selectively be moved in a threaded mode or an unthreaded mode. In said threaded mode, movement of the movable jaw can only occur by applying rotational force to the threaded mechanism. In said unthreaded mode, movement of the movable jaw can be achieved by applying force directly to the movable jaw in the desired direction of movement.

In addition to the foregoing, it would be advantageous to have a portable work table with an integrated vise that overcomes one or more of the foregoing shortcomings.

SUMMARY OF THE INVENTION

According to an aspect of this disclosure, a vise having a fixed block, a movable head, and a rod having a threaded portion and non-threaded portion is disclosed. The rod is configured to connect the fixed block to the movable head. The vise is configured to operate in both a threaded mode and an unthreaded mode. In the threaded mode, the movable head can only be moved by rotating the rod. In the unthreaded mode, the movable head can only be moved by applying force directly to the movable head in the desired direction of movement. The disclosed vise further includes a ratchet mechanism, a threaded mechanism and a toggle mechanism.

The ratchet mechanism includes a ratchet frame and a ratchet subassembly disposed within the ratchet frame. The ratchet subassembly further includes an inner ring that defines an opening that is configured to receive the non-threaded portion of the rod. The inner ring is configured to rotate as the rod is rotated. The inner ring further includes a proximal portion and a distal portion. The proximal portion includes an external surface having at least one ramp inclined in a first circumferential direction. The at least one ramp and includes an inclined portion and a stop face. The distal portion of the inner ring also has an external surface having at least one ramp that is inclined in a second circumferential direction that is opposite to the first circumferential direction. The ramp of the distal portion also includes an inclined surface and a stop face. The ratchet subassembly further includes a proximal external ratchet ring disposed around the proximal portion of the inner ring. The proximal external ratchet ring also includes an internal surface having at least one prong thereon that is configured to engage the stop face of the at least one ramp of the proximal portion of the inner ring such that the proximal external ratchet ring will rotate in a first direction when the rod is rotated in a first direction. The prong is also configured to brush over the inclined surface of the at least one ramp of the proximal portion of the inner ring such that the proximal external ratchet ring will remain substantially motionless when the rod is rotated in a second direction opposite to the first direction. The proximal external ratchet ring further includes an external surface having at least one ramp thereon. Said ramp is inclined in the second circumferential direction and includes an inclined surface and a stop face. The ratchet subassembly also includes a distal external ratchet ring disposed around the distal portion of the inner ring. The distal external ratchet ring also includes an internal surface having at least one prong that is configured to brush over the inclined surface of the at least one ramp of the distal portion of the inner ring such that distal external ratchet ring will remain substantially motionless when the rod is rotated in the first direction. The prong is also configured to engage the stop face of the at least one ramp of the distal portion of the inner ring such that the distal external ratchet ring will rotate in the second direction when the rod is rotated in the second direction. The distal external ratchet ring further includes an external surface having at least one ramp inclined in first circumferential direction. Said ramp also includes an inclined surface and a stop face.

The threaded mechanism includes a housing defining first and second prong cavities. The threaded mechanism further includes a jaw cylinder subassembly disposed within the housing and configured to selectively engage and disengage the threaded portion of the rod. The jaw cylinder subassembly further includes a first vise jaw and a second vise jaw that are at least partially disposed within a jaw ring. The jaw ring is substantially cylindrical in chap. The first vise jaw and second vise jaw each include an internal threaded surface. The first vise jaw and second vise jaw also each have an external surface having a prong that is configured to respectively engage the first prong cavity and the second prong cavity such that when the jaw cylinder subassembly is rotated in the first direction, the threaded surfaces of the first vise jaw and second vise jaw move into engagement with the threaded portion of the rod, and wherein when the jaw cylinder subassembly is rotated in the second direction, the threaded portions of the first vise jaw and second vise jaw are disengaged from the threaded portion of the rod.

The vise also includes a toggle mechanism connecting the ratchet mechanism to the threaded mechanism. The toggle mechanism is configured to toggle the vise between the threaded mode and the unthreaded mode. The toggle mechanism includes a switch rod, a trigger, a switch and a spring. The trigger is disposed within the ratchet frame and having a body defining an opening for receiving the switch rod. The body further includes a proximal node and a distal node. The trigger is configured to toggle between a first and second position. In the first position, the distal node is adjacent to the external surface of the distal external ratchet ring such that the at least one ramp thereon can engage the distal node, and the proximal node is spaced away from the external surface of the proximal external ratchet ring such that the at least one ramp thereon cannot engage the proximal node. In the second position the distal node is spaced away from the external surface of the distal external ratchet ring such that the at least one ramp thereon cannot engage the distal node, and the proximal node is adjacent to the external surface of the proximal external ratchet ring such that the at least one ramp thereon can engage the proximal node. The switch of the toggle mechanism is disposed within the housing and has a body defining an opening configured to receive the switch rod. The body includes a primary arm and a spring arm. The primary arm is configured to engage the jaw cylinder subassembly. The switch is further configured to toggle between a first position and a second position. In the first position, the primary arm rotates the jaw cylinder subassembly in the first direction such that the vise jaws are moved into threaded engagement with the threaded portion of the rod. In the second position, the primary arm rotates the jaw cylinder subassembly in the second direction such that the vise jaws are moved away from threaded engagement with the threaded portion of the rod. The toggle mechanism also includes a spring disposed within the housing and engaged to the spring arm. The spring is configured to toggle between a first bowed position and a second bowed position. In the first bowed position, the spring biases the switch and the trigger toward their respective first positions, and the vise is in the threaded mode. In the second bowed position, the spring biases the switch and the trigger toward their respective second positions and the vise is in the unthreaded mode;

When the vise is in the threaded mode, rotation of the rod in the second direction will cause the inclined portion of the at least one ramp of the distal external ratchet ring to engage the distal node of the trigger. This causes the trigger to rotate and impart rotational force in the first direction to both the switch rod and switch, such that the bias of the spring toward its first bowed position is overcome and the vise is toggled to the unthreaded mode. When the vise is in the unthreaded mode, rotation of the rod in the first direction will cause the inclined portion of the at least one ramp of the proximal external ratchet ring to engage the proximal node of the trigger. This causes the trigger to rotate and impart rotational force in the second direction to both the switch rod and the switch, such that the bias of the spring toward its second bowed position is overcome and the vise is toggled to the threaded mode.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

BRIEF DESCRIPTION OF THE DRAWINGS

Features of the vise in accordance with one or more embodiments are shown in the drawings, in which like reference numerals designate like elements. The drawings form part of this original disclosure in which.

DETAILED DESCRIPTION OF THE ILLUSTRATED EMBODIMENT(S)

Figure 1:
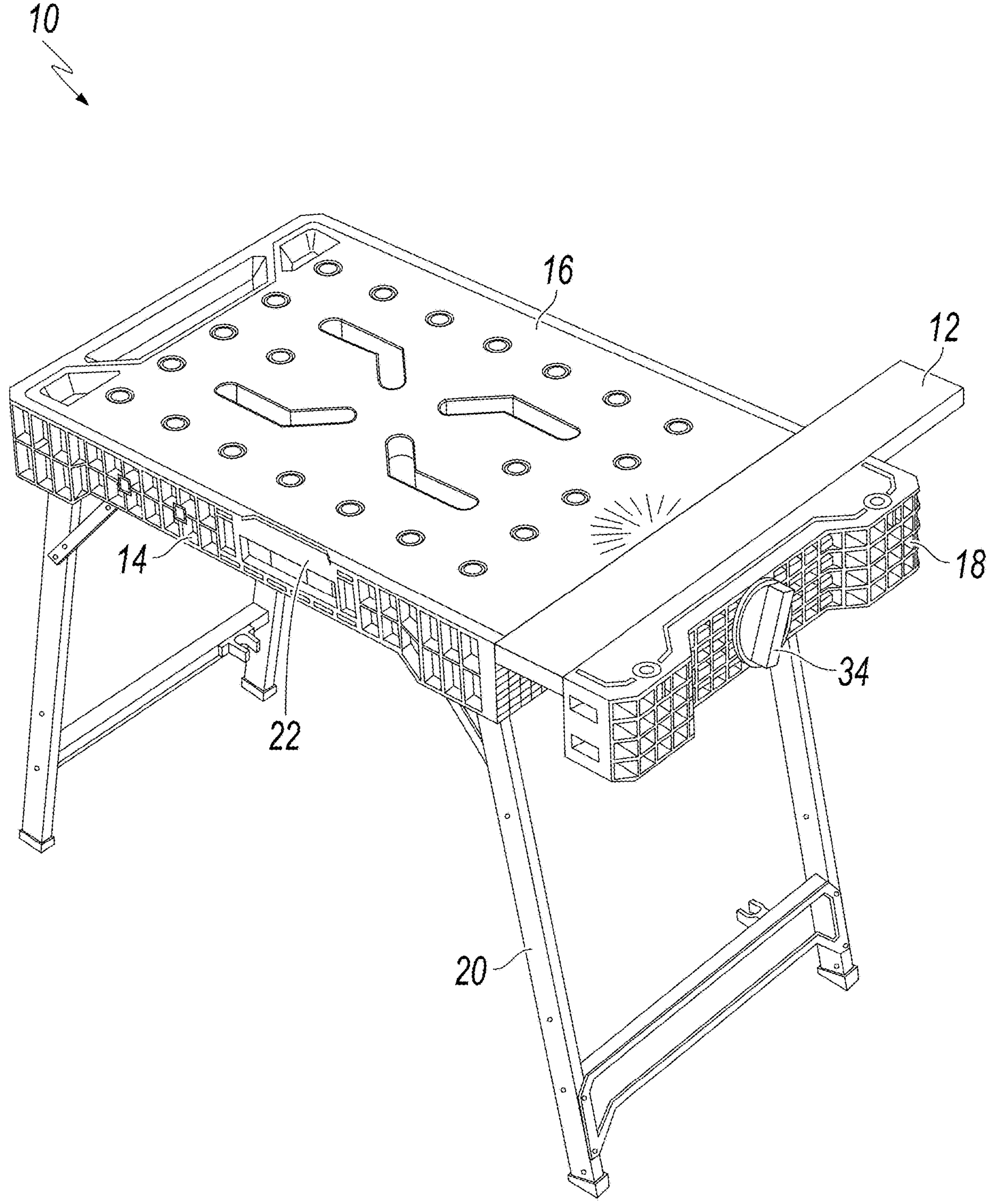
FIG. 1 shows a perspective view of a vise according to the present disclosure with the vise clamping an object.
Figure 2:
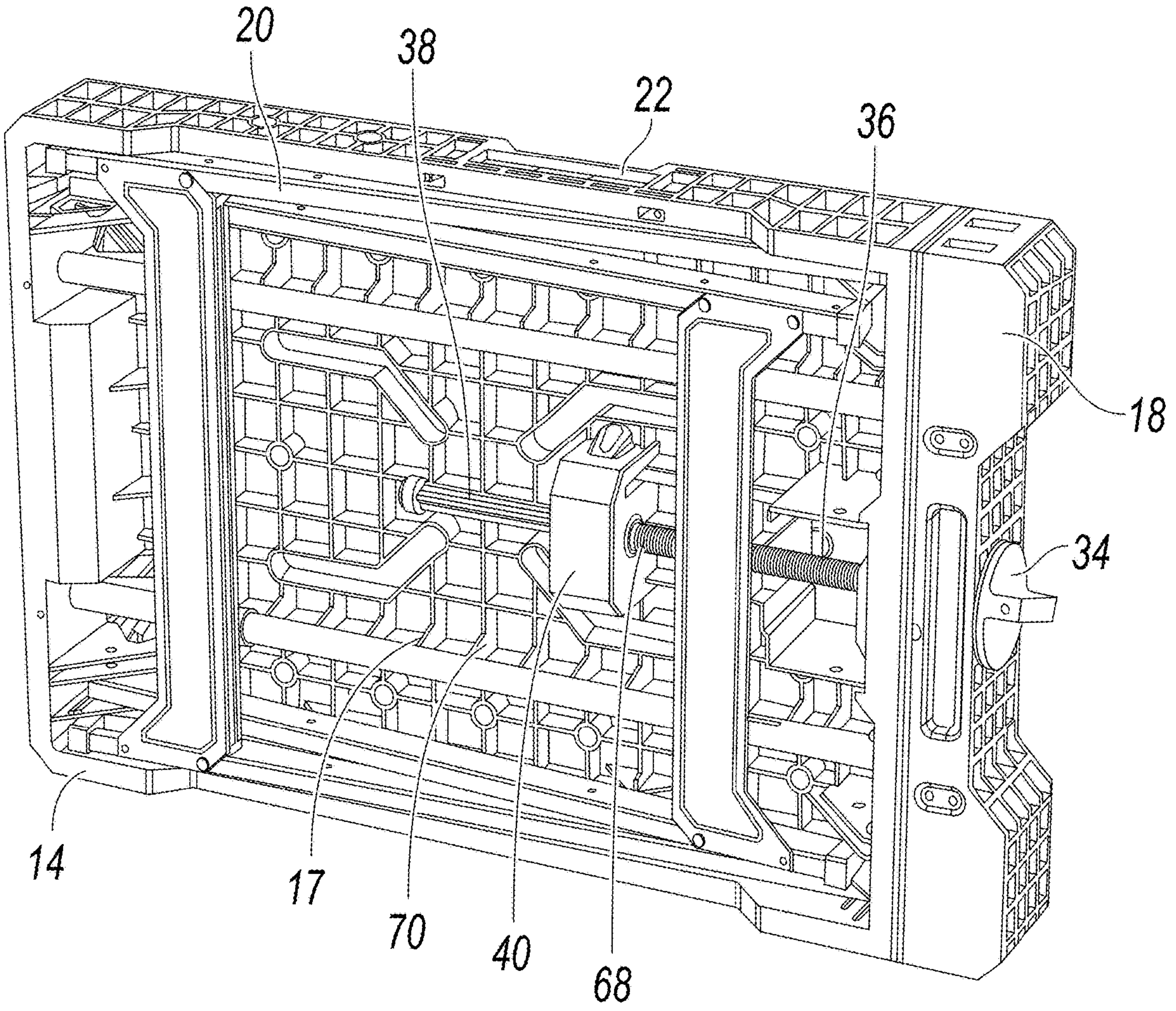
FIG. 2 shows a perspective view of a vise according to the present disclosure with the vise in the closed position and the legs in the folded position.

FIG. 1 illustrates a perspective view of a vise 10 clamping an object 12. The vise includes a fixed block 14 that includes an upper working surface 16 and a lower surface 17. The vise 10 also includes a movable head 18. The movable head 18 is configured to move between an open position and a closed position. In the open position, the movable head is spaced away from the fixed block 14. As seen in FIG. 1, in the open position, an object 12 can be clamped between the movable head 18 and the fixed block 14. In the closed position, which can best be seen in FIG. 2, the movable head 18 is adjacent to the fixed block 14. The vise 10 may also include a series of legs 20. Legs 20 may be moved between a deployed position (FIG. 1) and a folded position (FIG. 2). In the deployed position, legs 20 support the vise 10. In the folded position, legs 20 are moved into a position adjacent to the lower surface 17 and allow the vise 10 to be comfortably transported. The vise 10 may also include a handle 22 to help facilitate said transportation.

Figure 3:
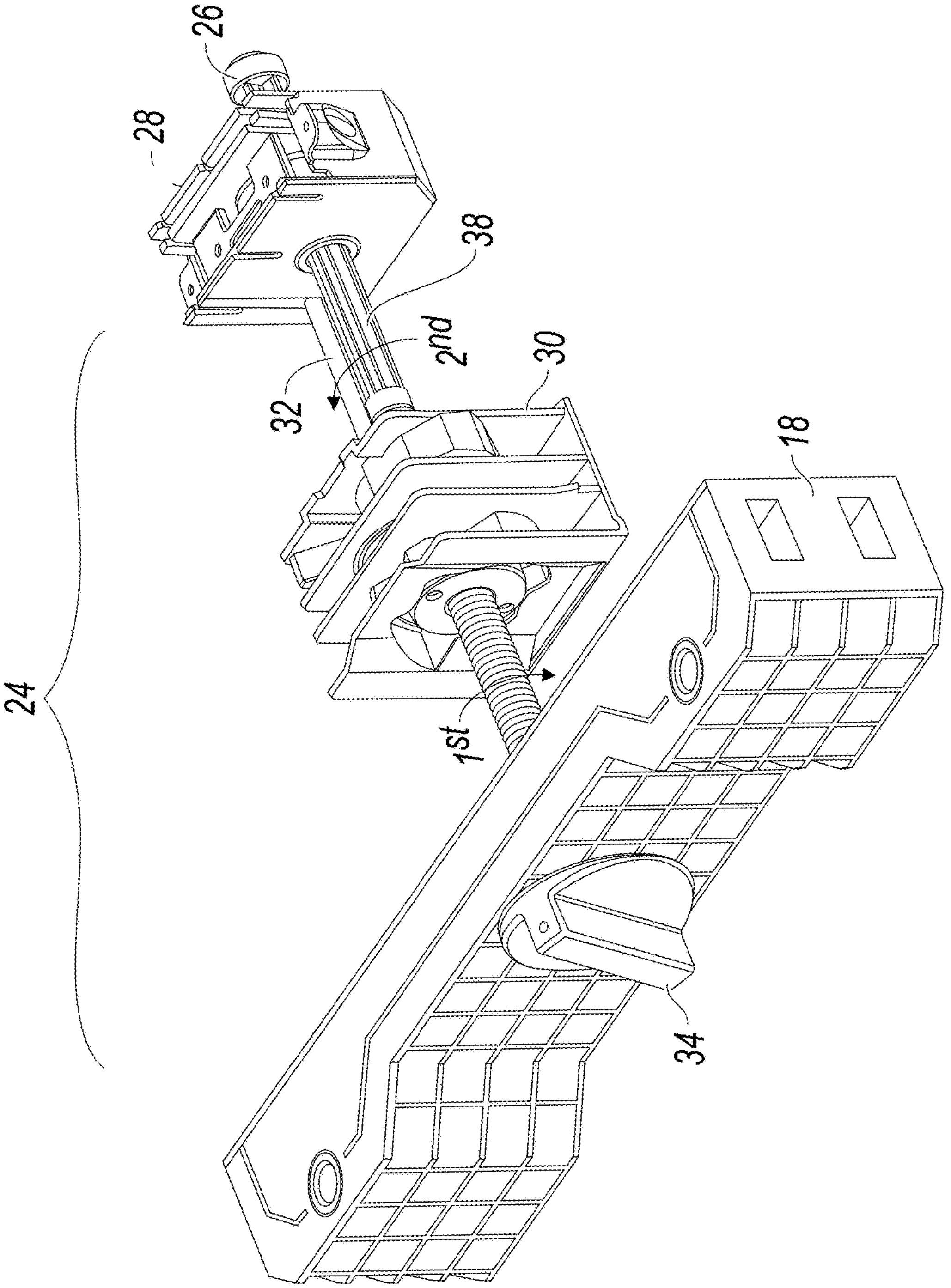
FIG. 3 shows a perspective view of the movable head and the vise mechanism.
Figure 4:
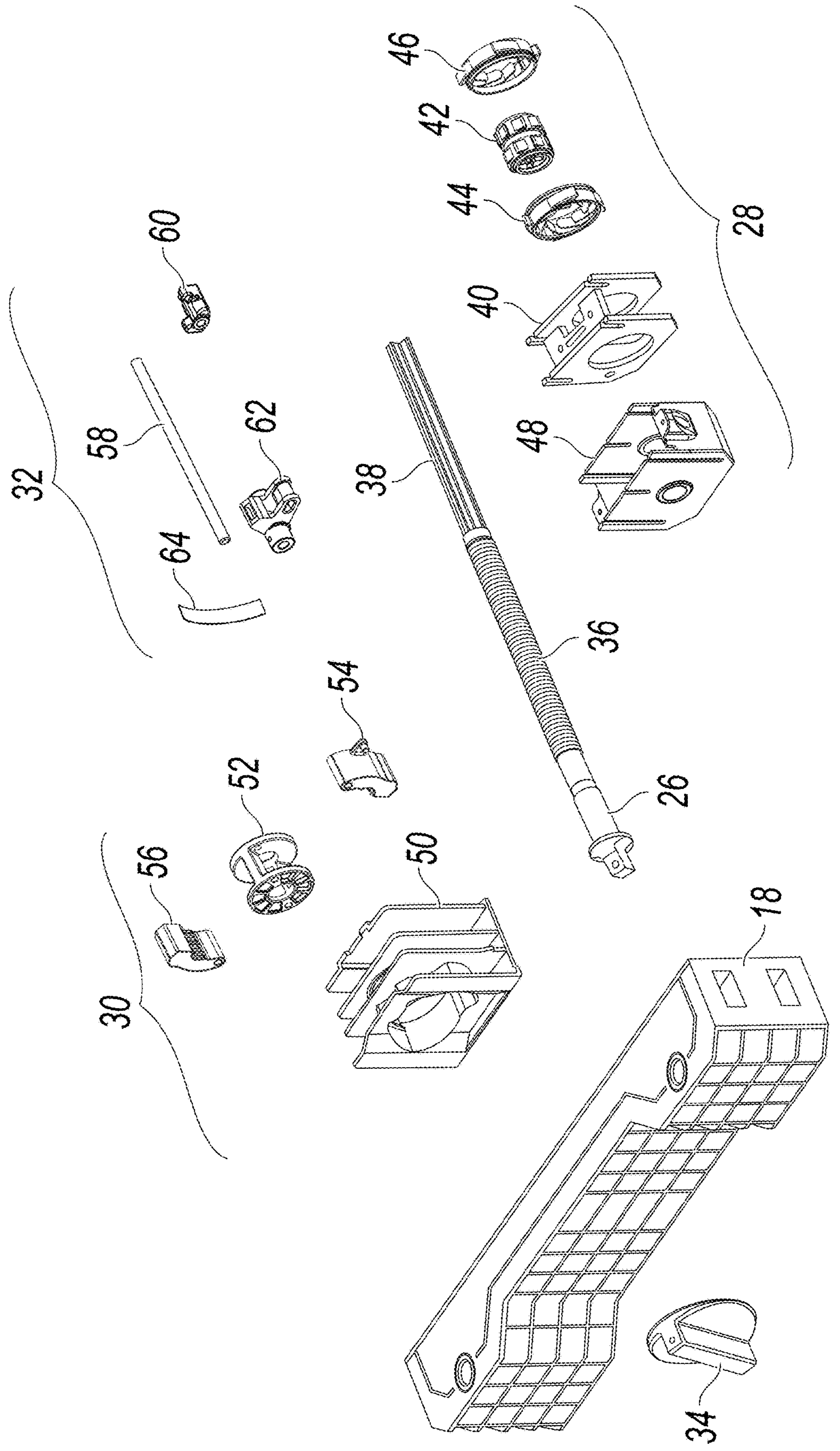
FIG. 4 shows an exploded view of the movable head and the vise mechanism.

In order to facilitate movement of the movable head 18 between its open and closed positions, the vise includes a vise mechanism 24. The vise mechanism is configured to be disposed beneath the fixed block 14 adjacent to the lower surface 17. FIG. 3 illustrates a view of the vise mechanism 24 with the fixed block 14 removed. FIG. 4 is an exploded view of the vise mechanism 24. Generally speaking, the vise mechanism 24 includes a rod 26, a ratchet mechanism 28, a threaded mechanism 30, a toggle mechanism and a force applicator 34.

As seen in FIG. 3, rod 26 connects the movable head 18 to the threaded mechanism 30 and the ratchet mechanism 28. Rod 26 also includes a threaded portion 36 and a non-threaded portion 38. The non-threaded portion is depicted as having a cross section that is cross shaped. However, those skilled in the art would recognize that the non-threaded portion 38 can have a cross section in a wide variety of different shapes, including but not limited to I-shaped, triangular, quadrangular, pentangular, etc. Rod 26 is also configured to be engaged to a force applicator 34, which is configured to apply rotational force to the rod 26.

The movement of the vise head 14 between its open and closed positions can be done in one of two modes. These modes, which are also controlled by the vise mechanism 24 are referred to as the threaded mode and the unthreaded mode. In the threaded mode, the vise head 18 can only be moved by rotating the rod 26. Typically, this rotation is achieved by rotating the force applicator 36. In the unthreaded mode, movement of the vise head 18 can only be achieved by applying force directly to the movable head 18 in the desired direction of movement.

We will now introduce elements of the vise mechanism 24 that facilitate movement in the threaded and unthreaded modes. As seen in FIG. 4, the ratchet mechanism 28 includes a frame 40, and a ratchet subassembly 41. The ratchet subassembly 41 includes an inner ring 42, a proximal external ratchet ring 44, and a distal external ratchet ring 46. (The terms "proximal" and "distal" as qualifiers are not to be construed as absolute terms. Instead, as a convention used herein, the descriptors proximal and distal relate to the relative distance from the movable head 18 when the vise 10 is assembled.) In certain embodiments, the ratchet mechanism may also include an external housing 48. The threaded mechanism 30 includes a housing 50 and a jaw cylinder subassembly 51. The jaw cylinder subassembly 51 comprises a jaw ring 52 and first and second vise jaws 54, 56. Finally, the toggle mechanism 32, includes a switch rod 58, a trigger 60, a switch 62 and a spring 64.

Figure 5:
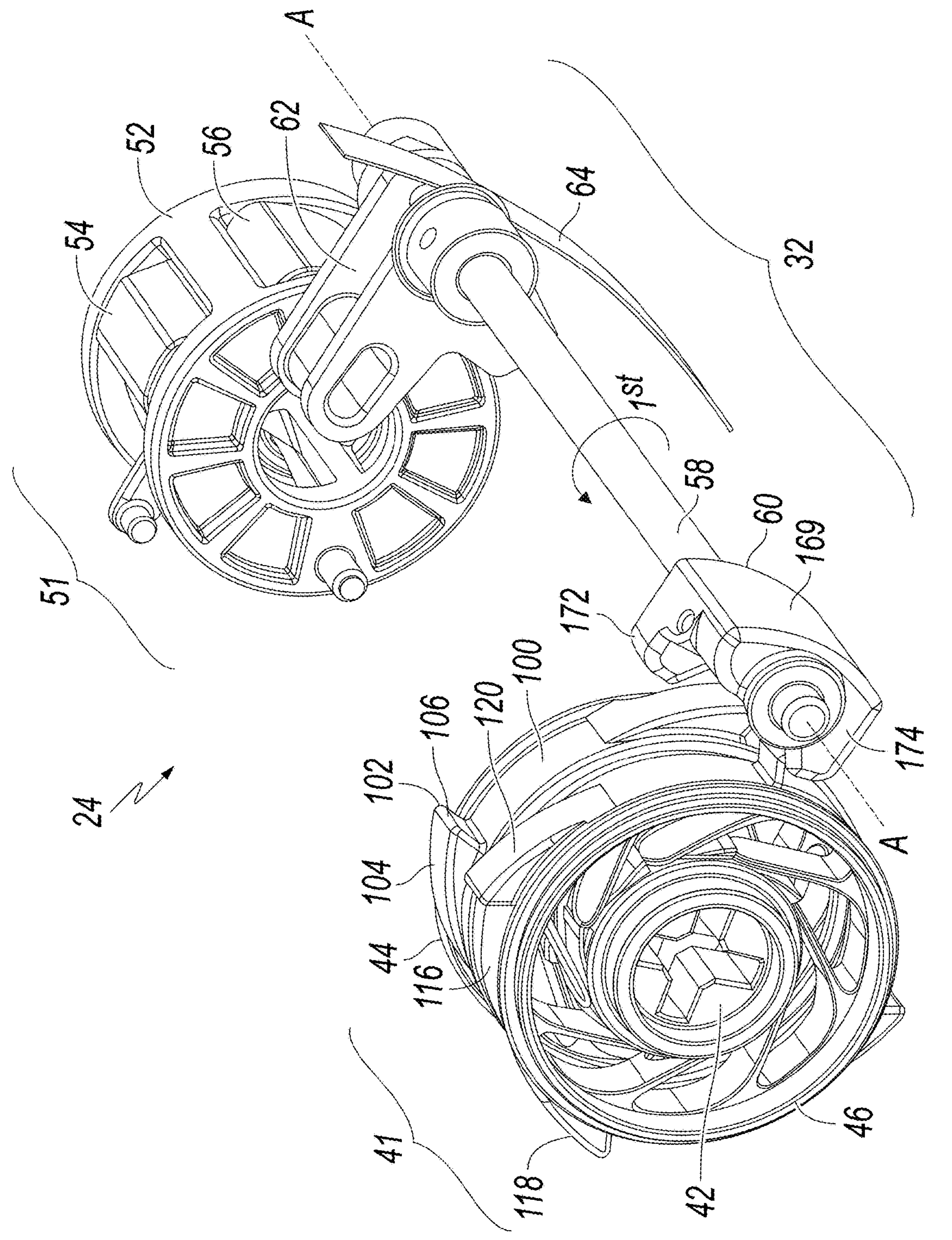
FIG. 5 shows a partial perspective view of a first embodiment of the vise mechanism in the threaded mode.
Figure 6:
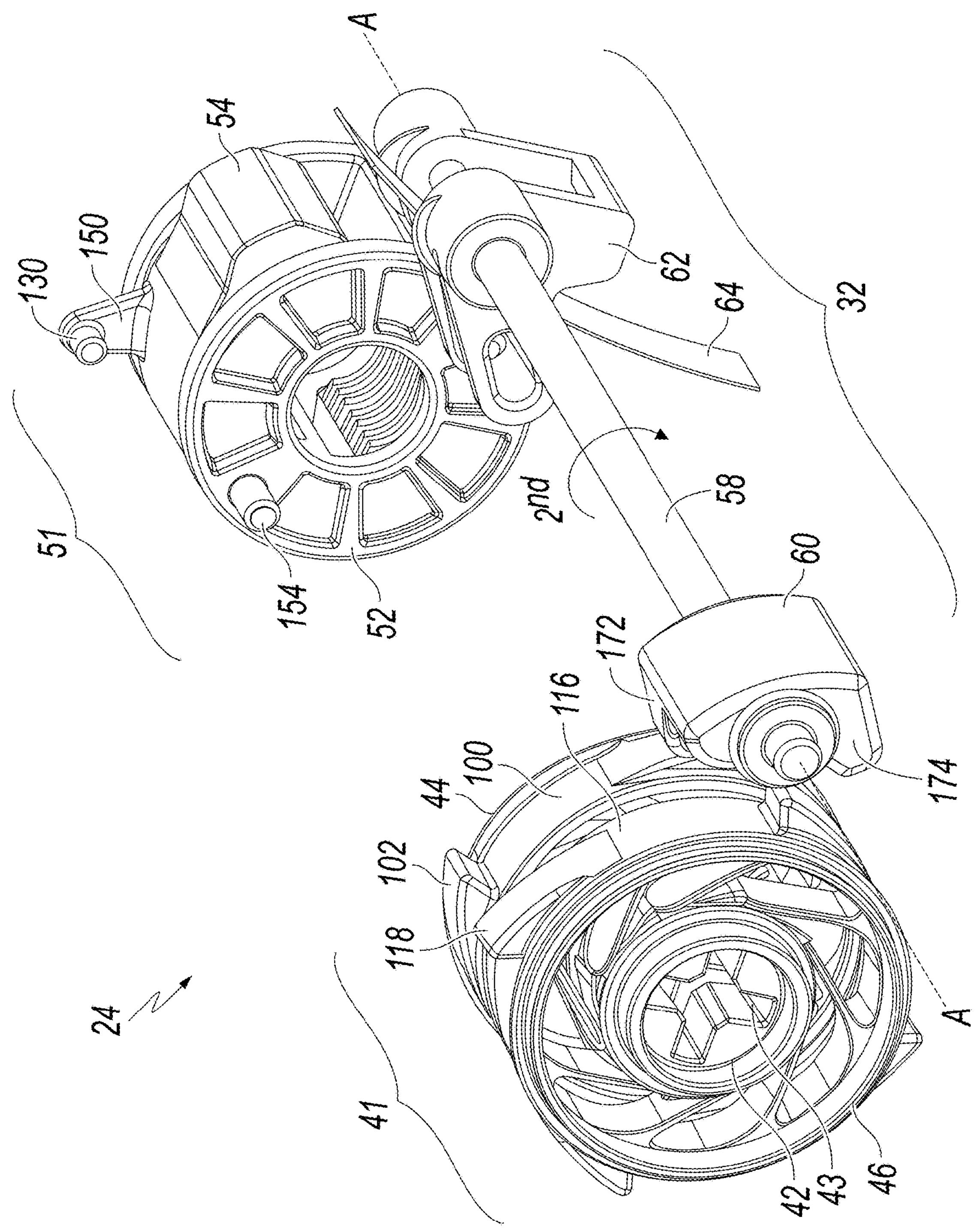
FIG. 6 shows a partial perspective view of the first embodiment of the vise mechanism in the unthreaded mode.
Figure 7:
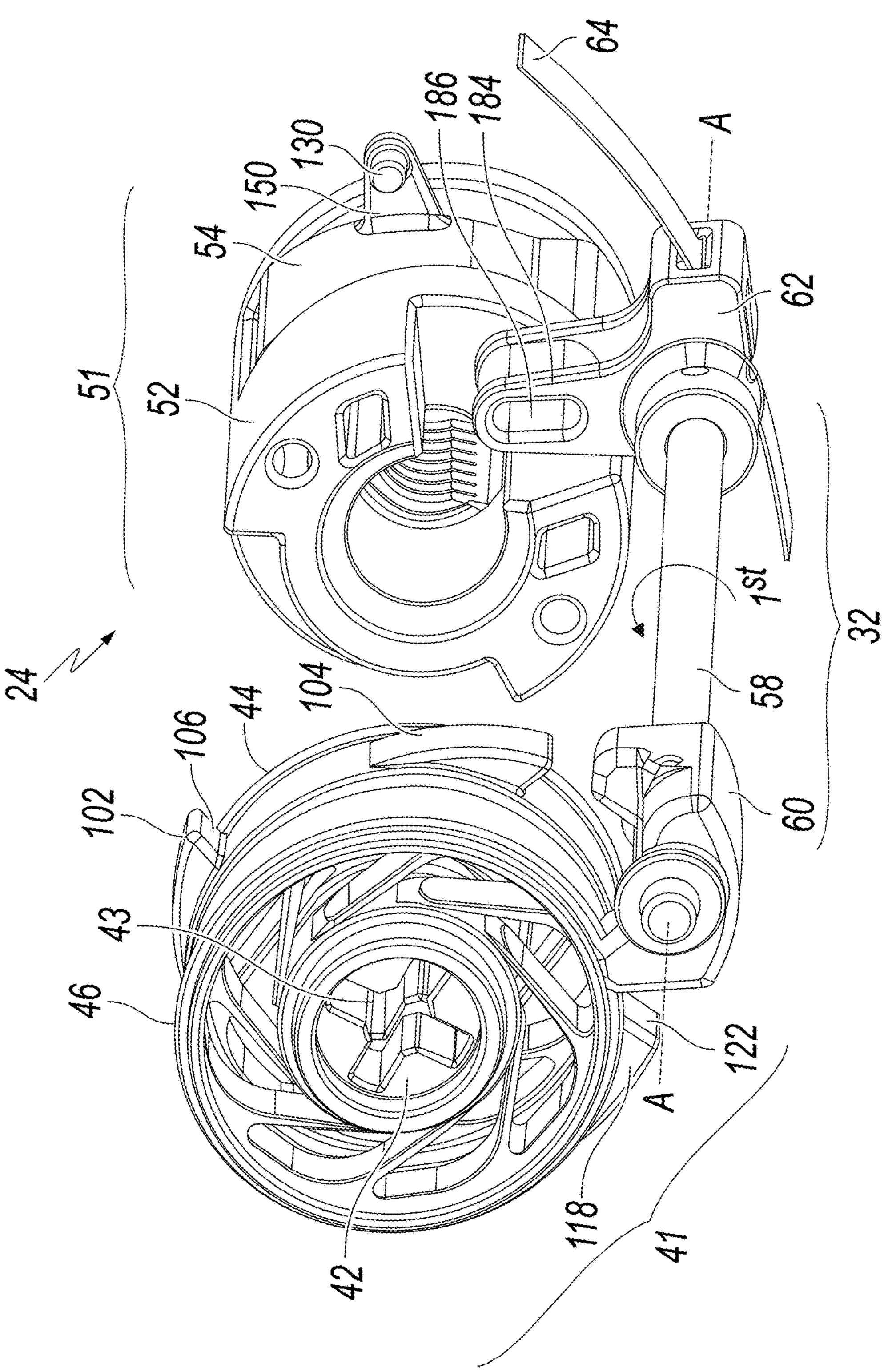
FIG. 7 shows a partial perspective view of a second embodiment of the vise mechanism in the threaded mode.

FIGS. 5 and 6 respectively show a partial view of the vise mechanism 24 in the threaded and unthreaded mode. More specifically, FIGS. 5-6 show a first embodiment of a ratchet subassembly 41 connected to a first embodiment of a jaw cylinder subassembly 51 via a toggle mechanism 32. FIG. 7 shows an alternate embodiment of a ratchet subassembly 41 connected to an alternate embodiment of a jaw cylinder subassembly 51 via a toggle mechanism 32. FIG. 7 shows the system in the threaded mode. The movement of the components of the vise mechanism in relation to the threaded and unthreaded modes will be discussed in more detail below.

Figure 8:
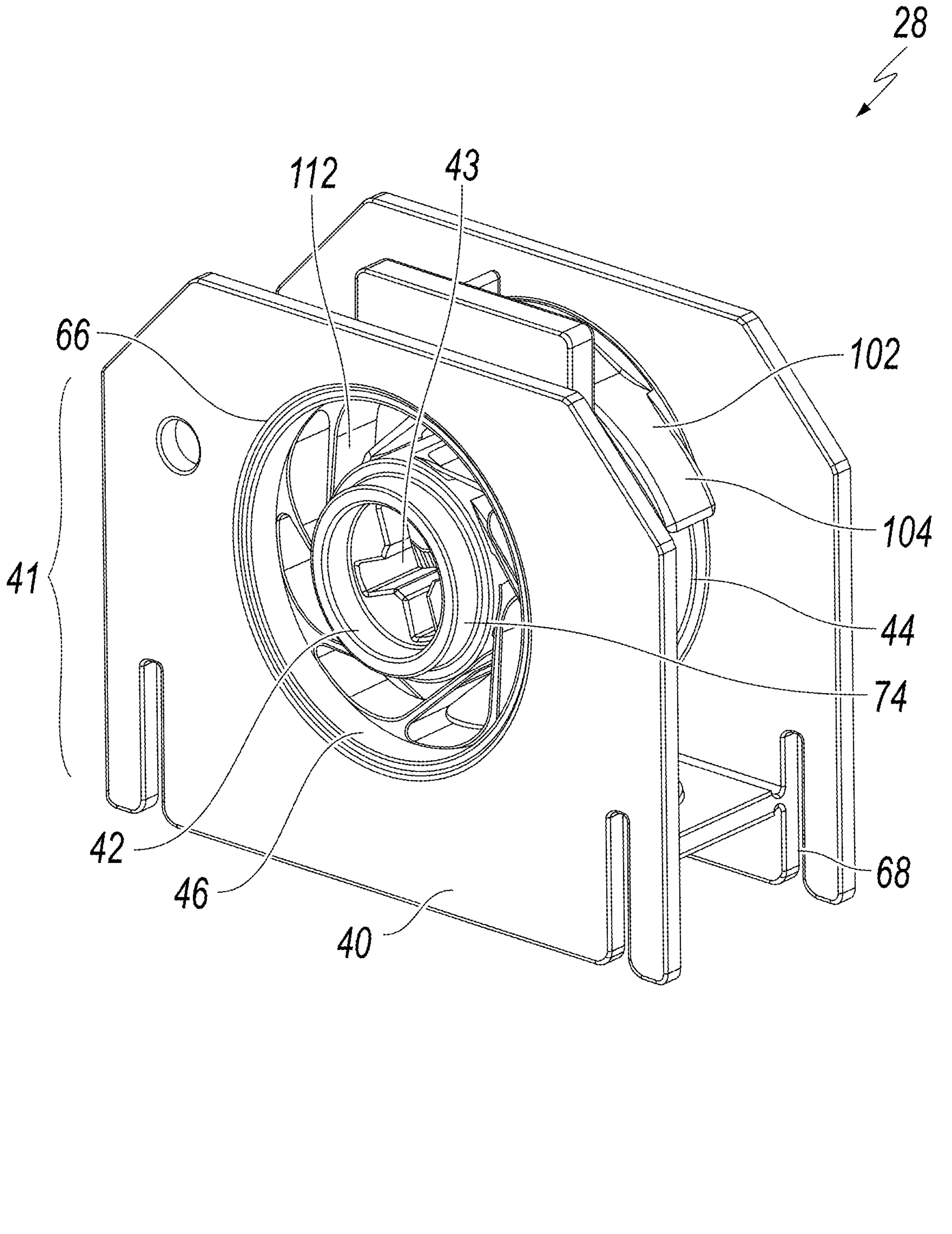
FIG. 8 shows a perspective view of the ratchet mechanism of the first embodiment of vise mechanism.
Figure 9:
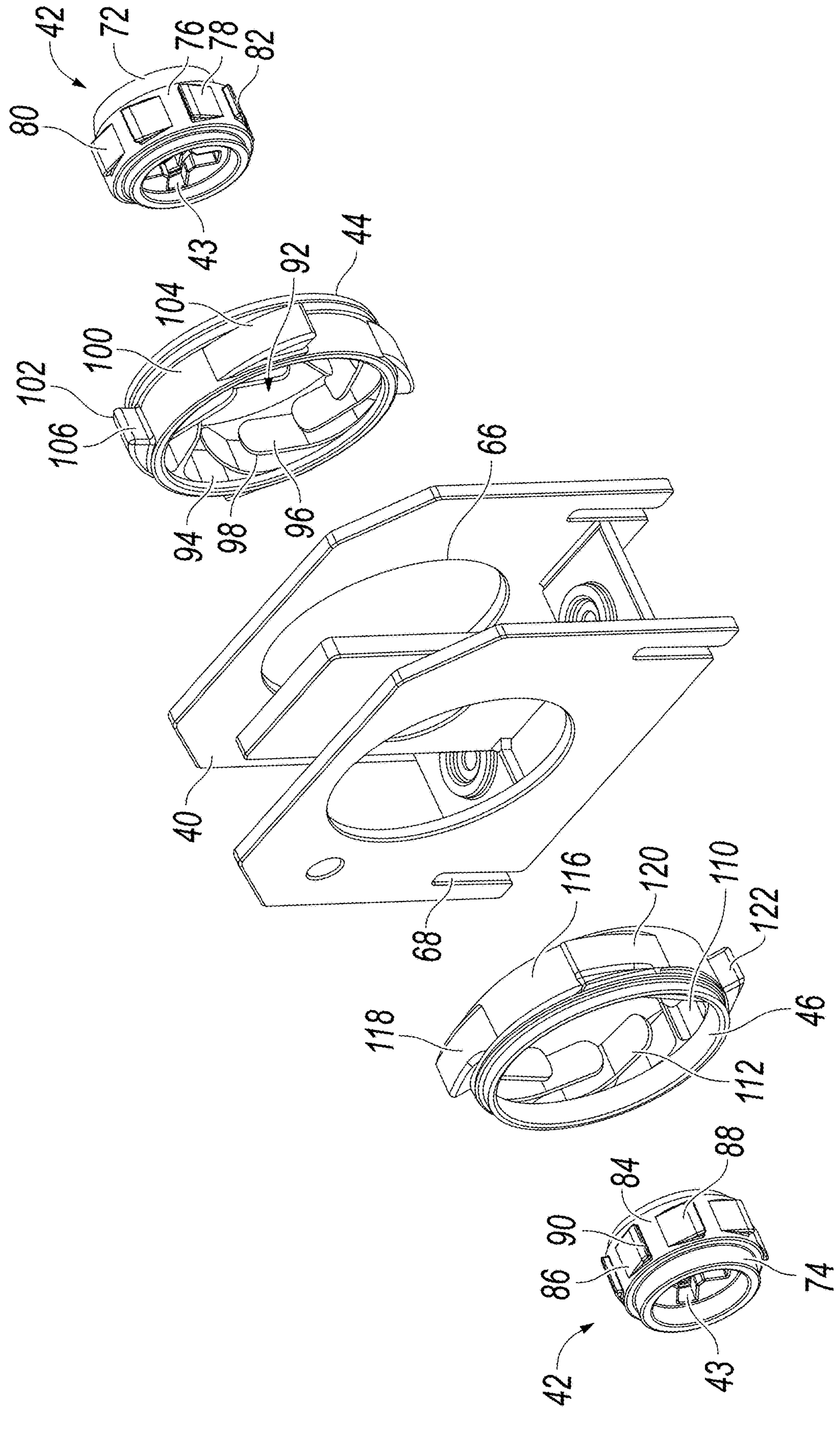
FIG. 9 is an exploded view of the ratchet mechanism of the first embodiment of the vise mechanism.

FIG. 8-15 show various views of the components of the ratchet mechanism 28. FIG. 8 shows a perspective view of a first embodiment of a ratchet mechanism 28. FIG. 9 shows an exploded view of the first embodiment of the ratchet mechanism 28. The frame 40 includes an opening 66 into which the ratchet subassembly 41 is disposed. The frame 40 may also include one or more slots 68 that are configured to receive ribs 70 that are formed on the lower surface 17 of the fixed block 14 (see FIG. 2).

The inner ring 42 defines an opening 43 that is configured to receive the non-threaded portion 38 of the rod 26. When the non-threaded portion 38 of the rod 26 is disposed within the opening 43 of the inner ring 42, the inner ring is configured to rotate as the rod 26 is rotated. The inner ring 42 also includes includes two portions: a proximal portion 72 and a distal portion 74. The proximal portion 72 includes an external surface 76 that includes at least one ramp 78. Ramp 78 is inclined in a first circumferential direction and includes an inclined portion 80 and a stop face 82. Similarly, the distal portion 74 also includes an external surface 84 that includes at least one ramp 86. Ramp 86 is inclined in a second circumferential direction that is opposite to the first circumferential direction. (For ease of reference and clarity of description, the first circumferential direction for ramps is considered to be up and to the right when the ramp is in the 12 o'clock position and one is looking at the front of the ratchet subassembly 41. See FIG. 13. Conversely, from that same perspective, the second circumferential direction is considered to be up and to the left. However, those skilled in the art will recognize that these directions are not absolute and that in practice, they could be reversed so long as the corresponding directions/rotations of the elements described herein are likewise reversed.) Ramp 86 also includes an inclined surface 88 and a face 90.

Figure 10:
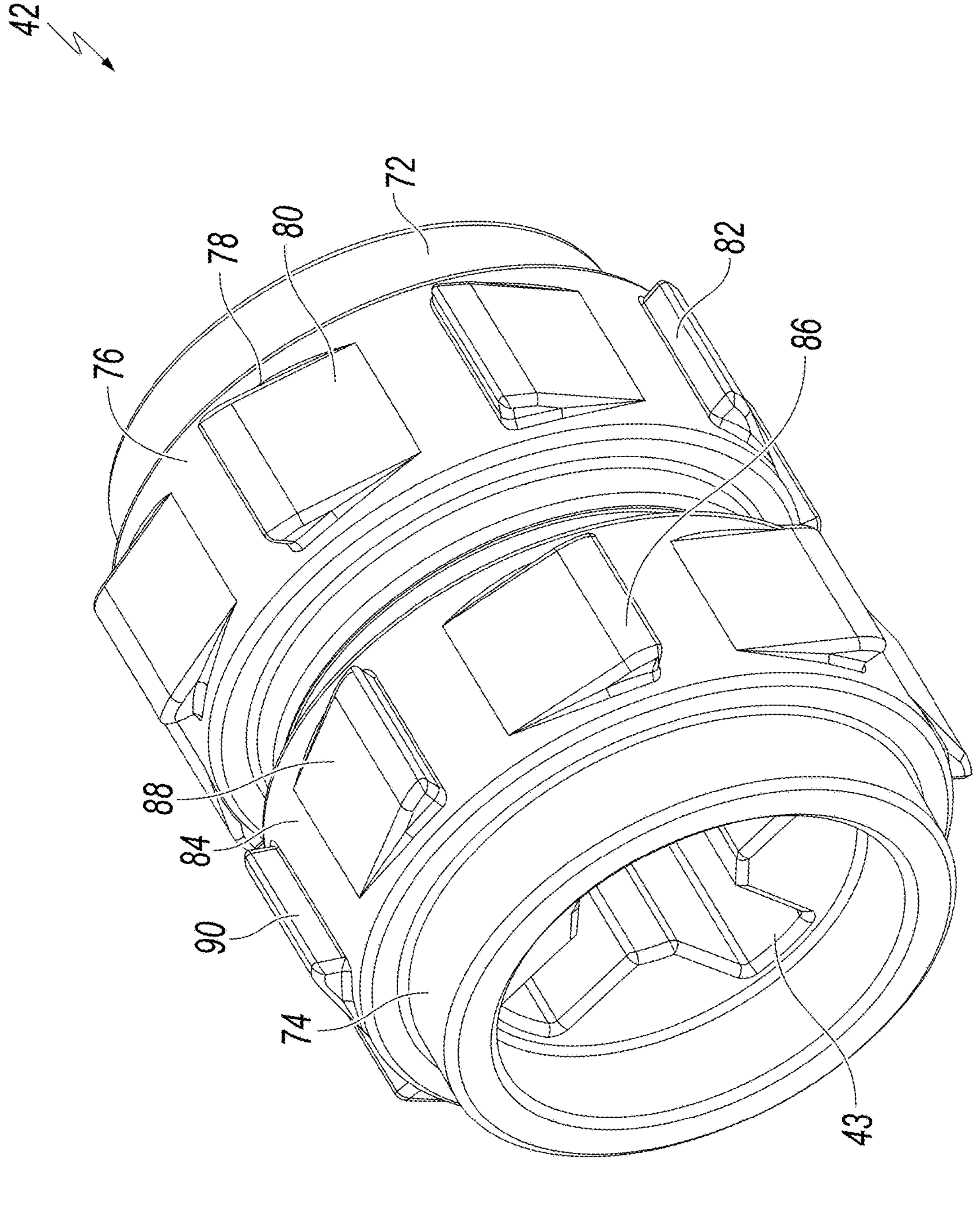
FIG. 10 is a perspective view of an inner ring of the ratchet mechanism of the vise mechanism.

As shown in FIG. 10, the inner ring 42 can be manufactured as a single structure. Alternatively, as shown in FIG. 9, the inner ring can be manufactured as two separate structures. Those skilled in the art will recognize that the proximal portion 72 and the distal portion 74 are inverse of one another. Therefore, if they are separate structures as shown in FIG. 9, they can be manufactured to be identical. They can then be assembled such that one portion is turned 180 degrees from the other.

As previously discussed, the ratchet mechanism 28 also includes a proximal external ratchet ring 44 and a distal external ratchet ring 46. The proximal external ratchet ring 44 defines an opening 92 that is sized to receive the proximal portion 72 of the inner ring 42. The proximal external ratchet ring 44 also includes an internal surface 94 having at least one prong 96. Prong 96 extends from the internal surface 94 into the opening 92. Prong 96 includes an end 98 that is distal from the internal surface 94. End 98 is configured to engage the stop face 82 of the at least one ramp 78 that is disposed on the external surface 76 of the proximal portion 72 of the inner ring 42. Prong 96 is rigid such that when the inner ring 42 is rotated in a first direction and end 98 engages stop face 82, the proximal external ratchet ring 44 will also rotate in the first direction. Prong 96 is further positioned such that when the inner ring 42 is rotated in a second direction opposite to the first direction, the end 98 will brush over the inclined surface 80 of the at least one ramp 78 and the proximal external ratchet ring 44 will remain substantially motionless. On the figures, the first rotational direction is depicted with a $1^{st}$ and the second rotational direction is depicted with a $2^{nd}$. Those skilled in the art will recognize that these rotational directions are not absolute and that in practice, they could be reversed so long as the corresponding directions/rotations of the elements described herein are likewise reversed. The proximal external ratchet ring 44 also includes an external surface 100 that has at least one ramp 102. Ramp 102 is inclined in the second circumferential direction and includes an inclined portion 104 and a stop face 106. In an alternate embodiment, the external surface 100 may include multiple ramps 102 inclined in the second circumferential direction. Each of the multiple ramps 102 include an inclined surface 104 and a stop face 106.

Figure 11:
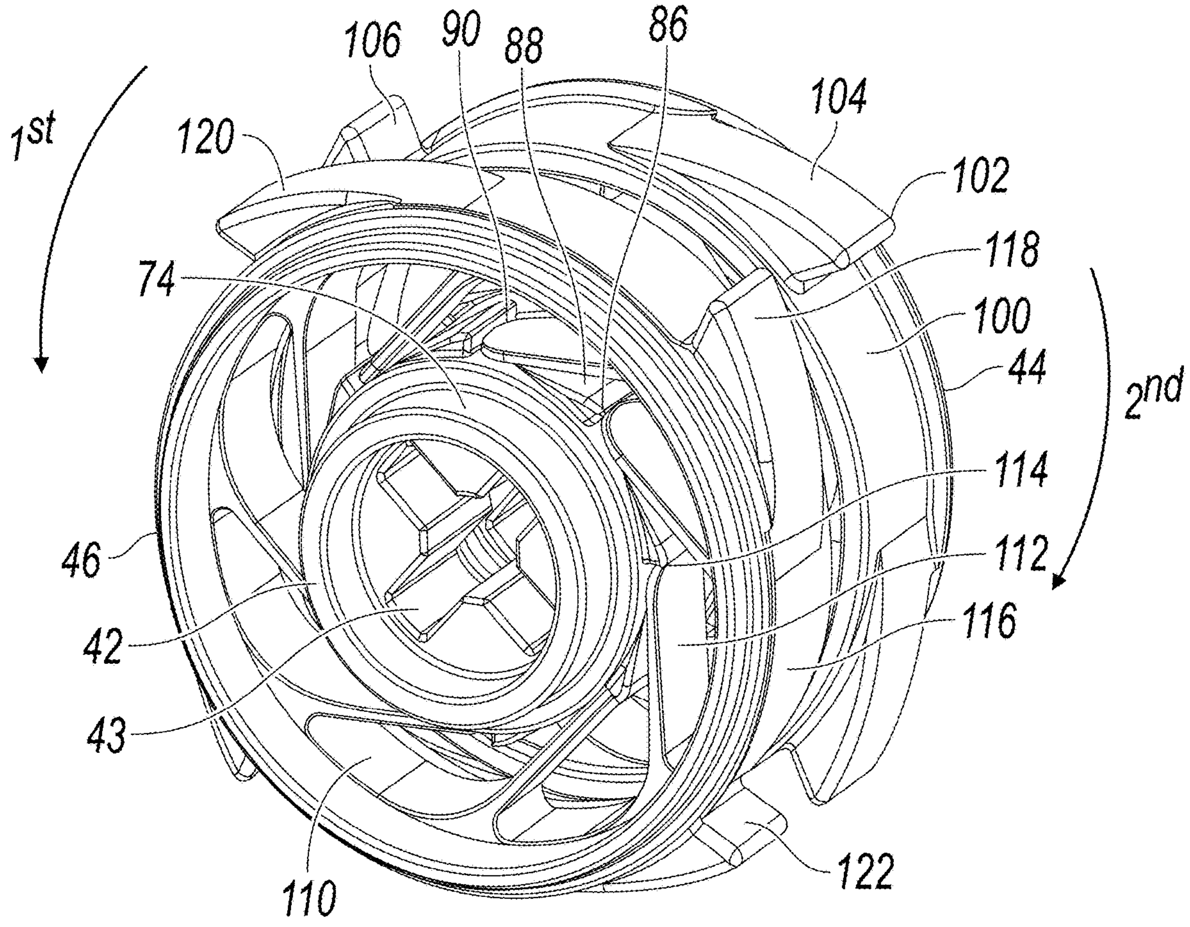
FIG. 11 is a perspective view of a first embodiment of the ratchet subassembly.

In a preferable embodiment as shown in FIG. 11, the external surface 76 of the proximal portion 72 of the inner ring 42 includes multiple ramps 78. Each ramp 78 is inclined in the first direction and includes an inclined portion 80 and a stop face 82. In this embodiment, the internal surface 94 of the proximal external ratchet ring 44 includes multiple prongs 96. The number of prongs 96 corresponds to the number of ramps 78. For example, FIG. 11 shows eight prongs 96 and eight ramps 78. The ends 98 of each prong 96 are configured to engage the stop faces 82 of each ramp 78. Each prong 96 is rigid such that when the inner ring 42 is rotated in the first direction, the ends 98 engage the stop faces 82 and the proximal external ratchet ring 44 also rotates in the first direction. Conversely, when the inner ring 42 is rotated in the second direction, the ends 98 of prongs 96 brush over the inclined surfaces 80 of each ramp 78 and the proximal external ratchet ring 44 remains substantially motionless.

Similar to the proximal external ratchet ring 44, the distal external ratchet ring 46 defines an opening 108 that is sized to receive the distal portion 74 of the inner ring 42. The distal external ratchet ring 46 also includes an internal surface 110 having at least one prong 112. Prong 112 extends from the internal surface 110 into the opening 108.

Figure 12:
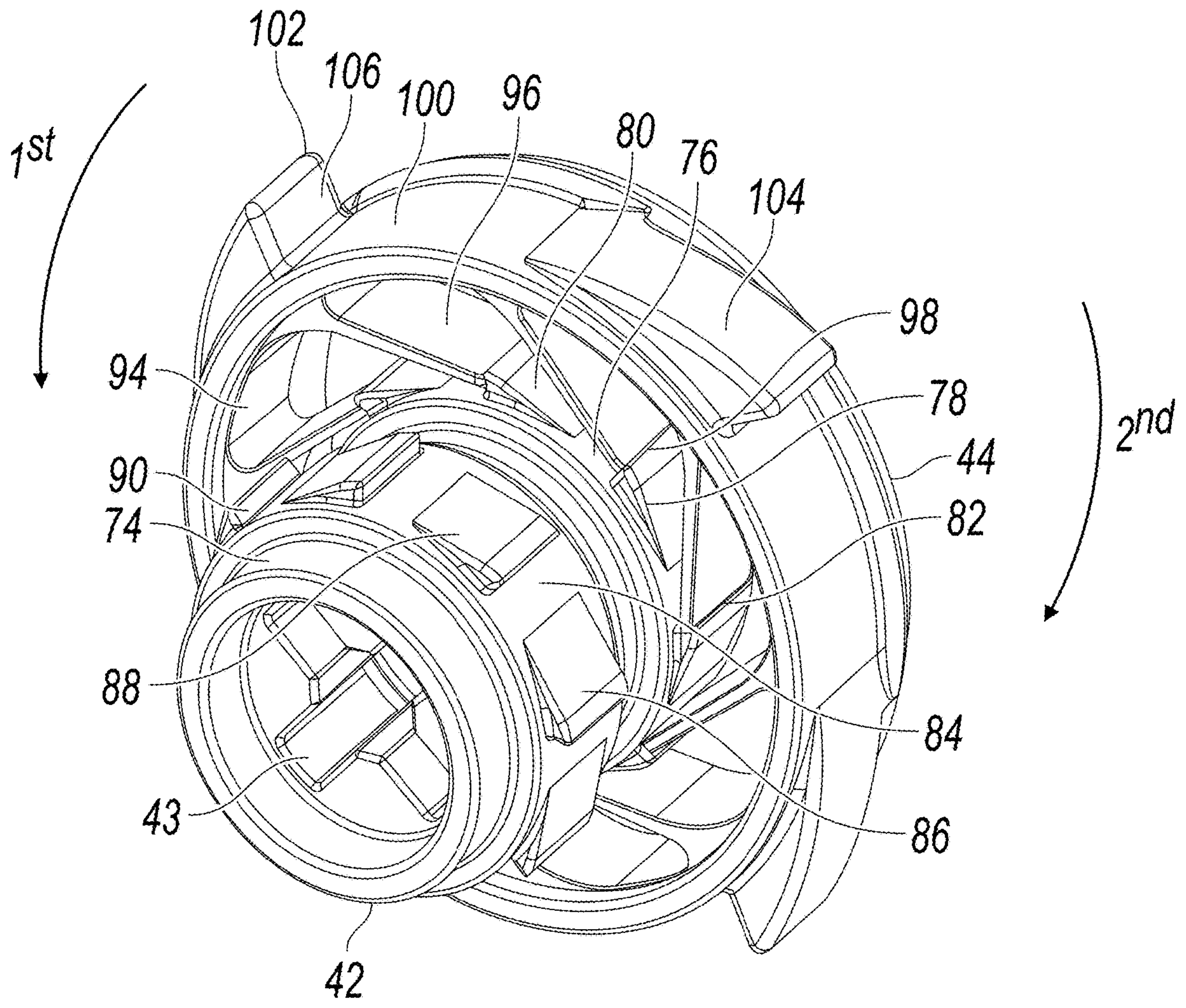
FIG. 12 of is a perspective partial view of the first embodiment of the ratchet subassembly.
Figure 13:
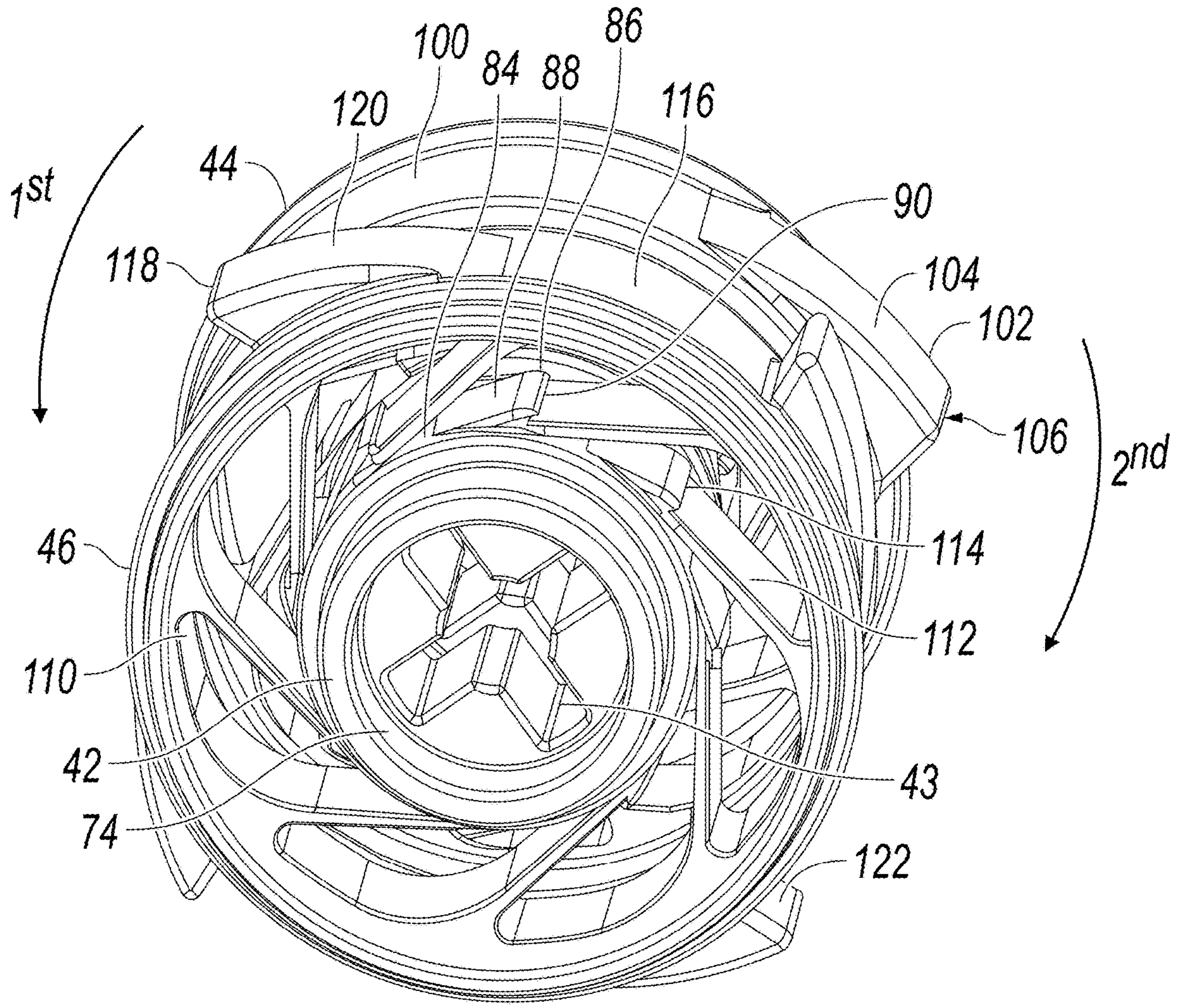
FIG. 13 is a perspective view of a second embodiment of a ratchet subassembly.
Figure 14:
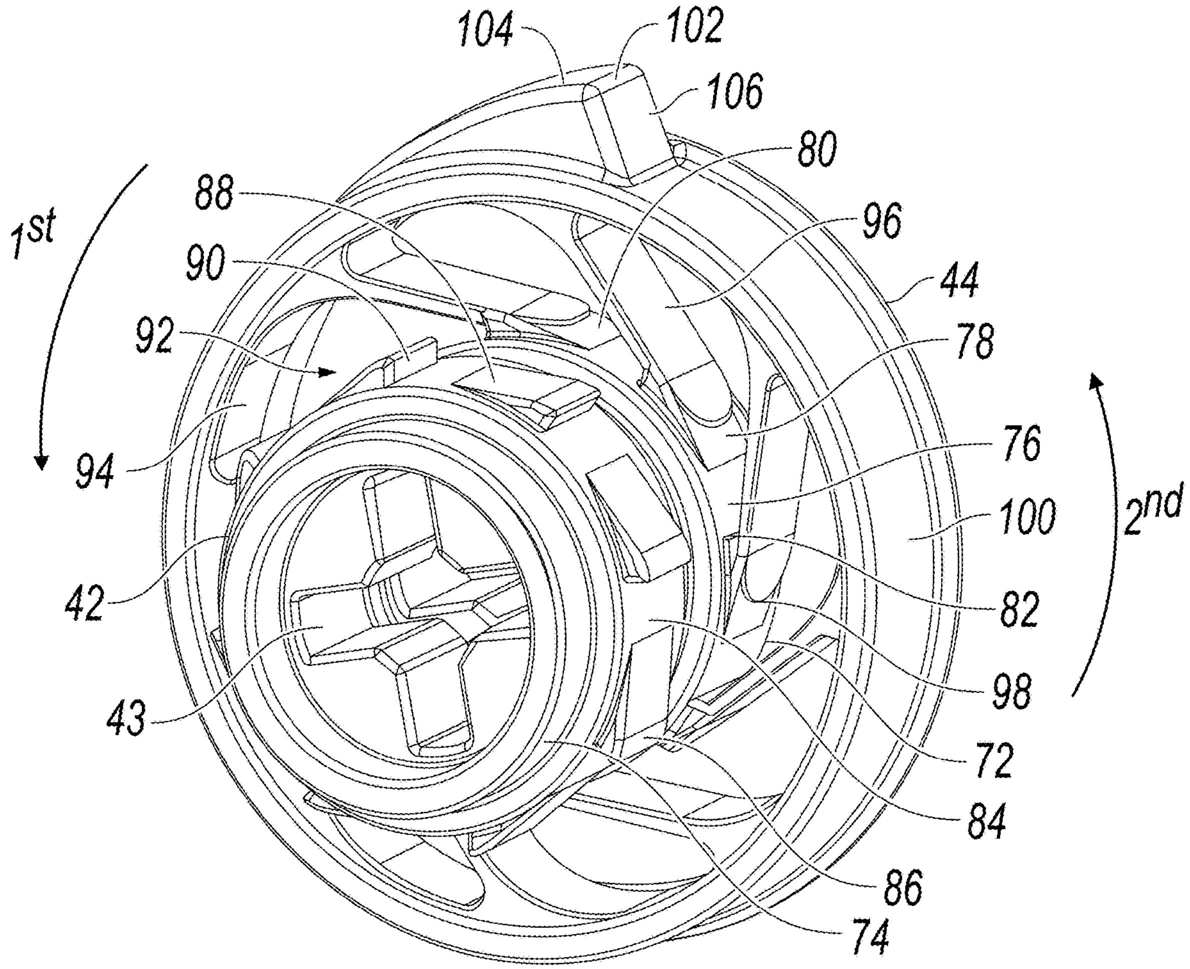
FIG. 14 is a perspective partial view of the second embodiment of the ratchet subassembly.

Prong 112 includes an end 114 that is distal from the internal surface 110. End 114 is configured to engage the stop face 90 of the at least one ramp 86 that is disposed on the external surface 84 of the distal portion 74 of the inner ring 42. Prong 112 is rigid such that when the inner ring 42 is rotated in the second direction an end 114 engages stop face 90, the distal external ratchet ring 46 will also rotate in the second direction. Prong 112 is further positioned such that when the inner ring 42 is rotated in the first direction opposite to the second direction, the end 114 will brush over the inclined surface 88 of the at least one ramp 86 and the distal external ratchet ring 46 will remain substantially motionless. As best seen in FIG. 14, the proximal external ratchet ring 44 also includes an external surface 100 that has at least one ramp 102. Ramp 102 is inclined in the first circumferential direction and includes an inclined portion 104 and a stop face 106. In an alternate embodiment, as seen in FIG. 12, the external surface 100 may include multiple ramps 102 inclined in the first circumferential direction. Each of the multiple ramps 102 include an inclined surface 104 and a stop face 106.

In a preferable embodiment as shown in FIGS. 12 and 14, the external surface 76 of the proximal portion 72 of the inner ring 42 includes multiple ramps 78. Each ramp 78 is inclined in the second direction and includes an inclined portion 80 and a stop face 82. In this embodiment, the internal surface 94 of the proximal external ratchet ring 44 includes multiple prongs 96. The number of prongs 96 corresponds to the number of ramps 78. For example, FIGS. 12 and 14 show eight prongs 96 and eight ramps 78. The ends 98 of each prong 96 are configured to engage the stop faces 82 of each ramp 78. Each prong 96 is rigid such that when the inner ring 42 is rotated in the second direction, the ends 98 engage the stop faces 82 and the proximal external ratchet ring 44 also rotates in the second direction. Conversely, when the inner ring 42 is rotated in the first direction, the ends 98 of prongs 96 brush over the inclined surfaces 80 of each ramp 78 and the proximal external ratchet ring 44 remains substantially motionless.

Figure 15:
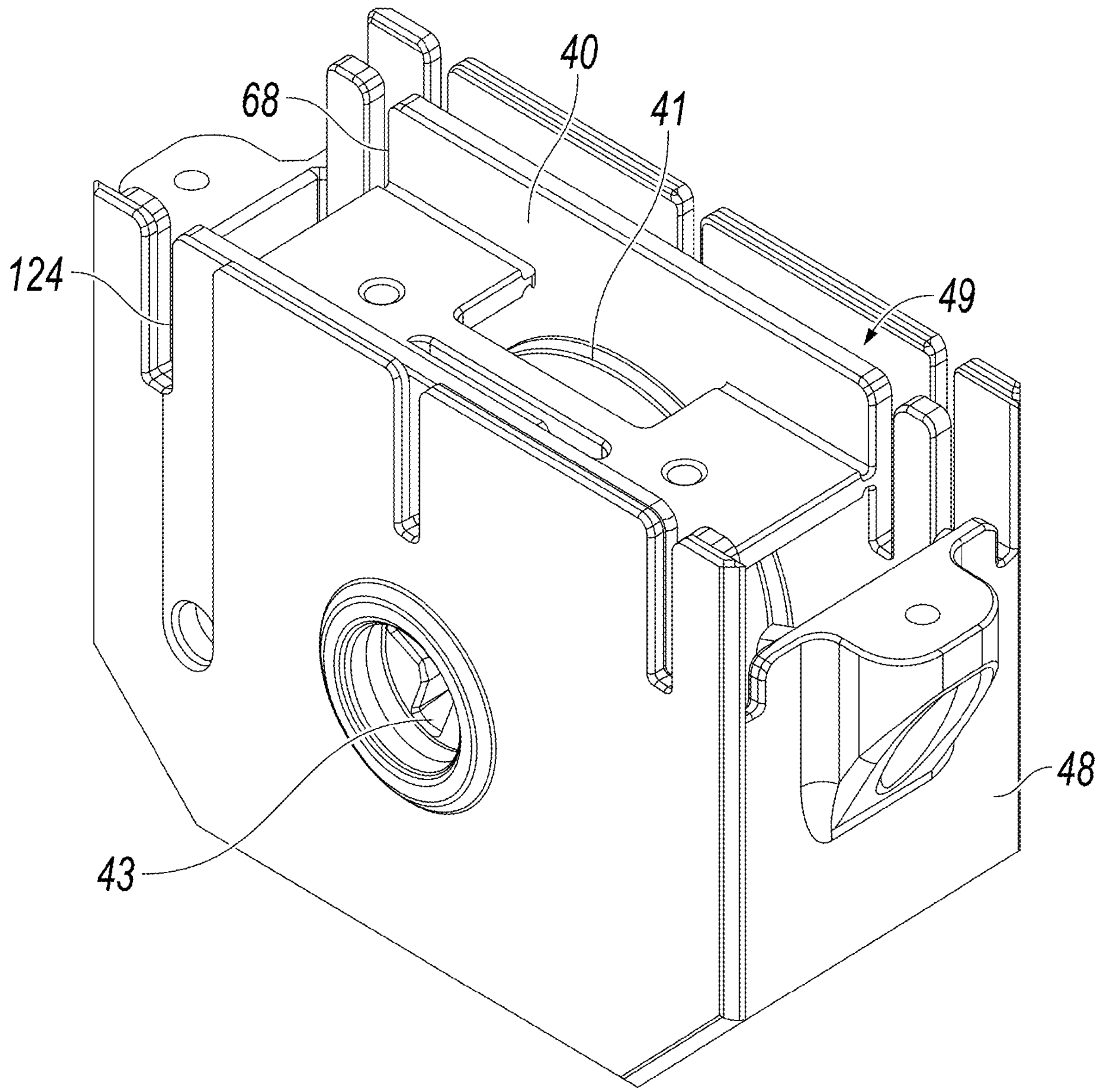
FIG. 15 is perspective view of the ratchet mechanism disposed within a ratchet housing.

As seen in FIG. 15, the ratchet mechanism 28 may also include an external housing 48. External housing 48 defines an opening 49, into which the frame 40 and the ratchet subassembly 41 are disposed. Housing 48 may also include slots 124, which like slots 68 are configured to receive ribs 70 when the ratchet mechanism 28 is secured to the lower surface 17 of the fixed block 14.

The vise mechanism 24 also includes a threaded mechanism 30 that is configured to selectively engage the threaded portion 36 of rod 26. As shown in FIG. 4, the threaded mechanism 30 contains a housing 50 and a jaw cylinder subassembly 51, which broadly consists of a jaw ring 52 and a first and second vise jaw 54, 56.

Figure 19:
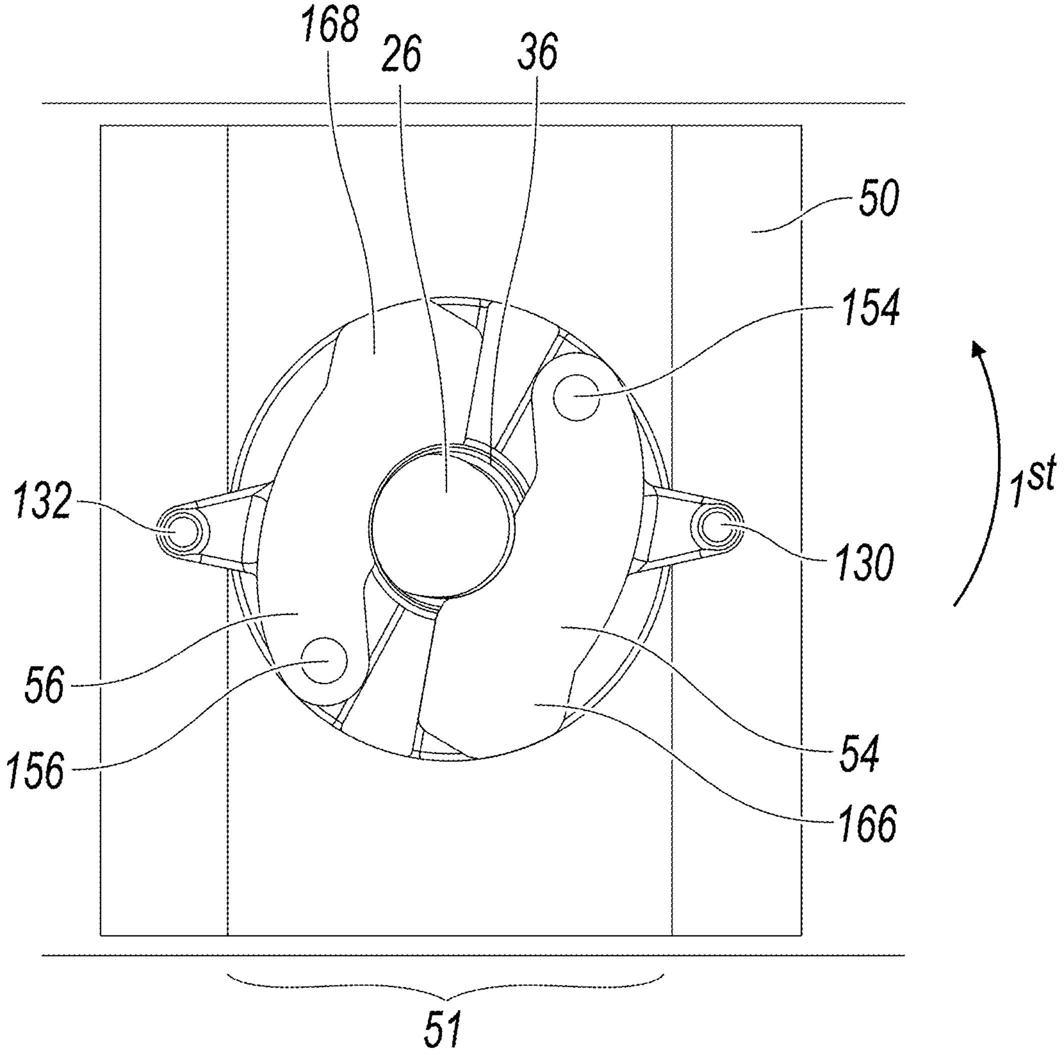
FIG. 19 is a plan view of the first embodiment of the threaded mechanism of the vise in the threaded mode.
Figure 20:
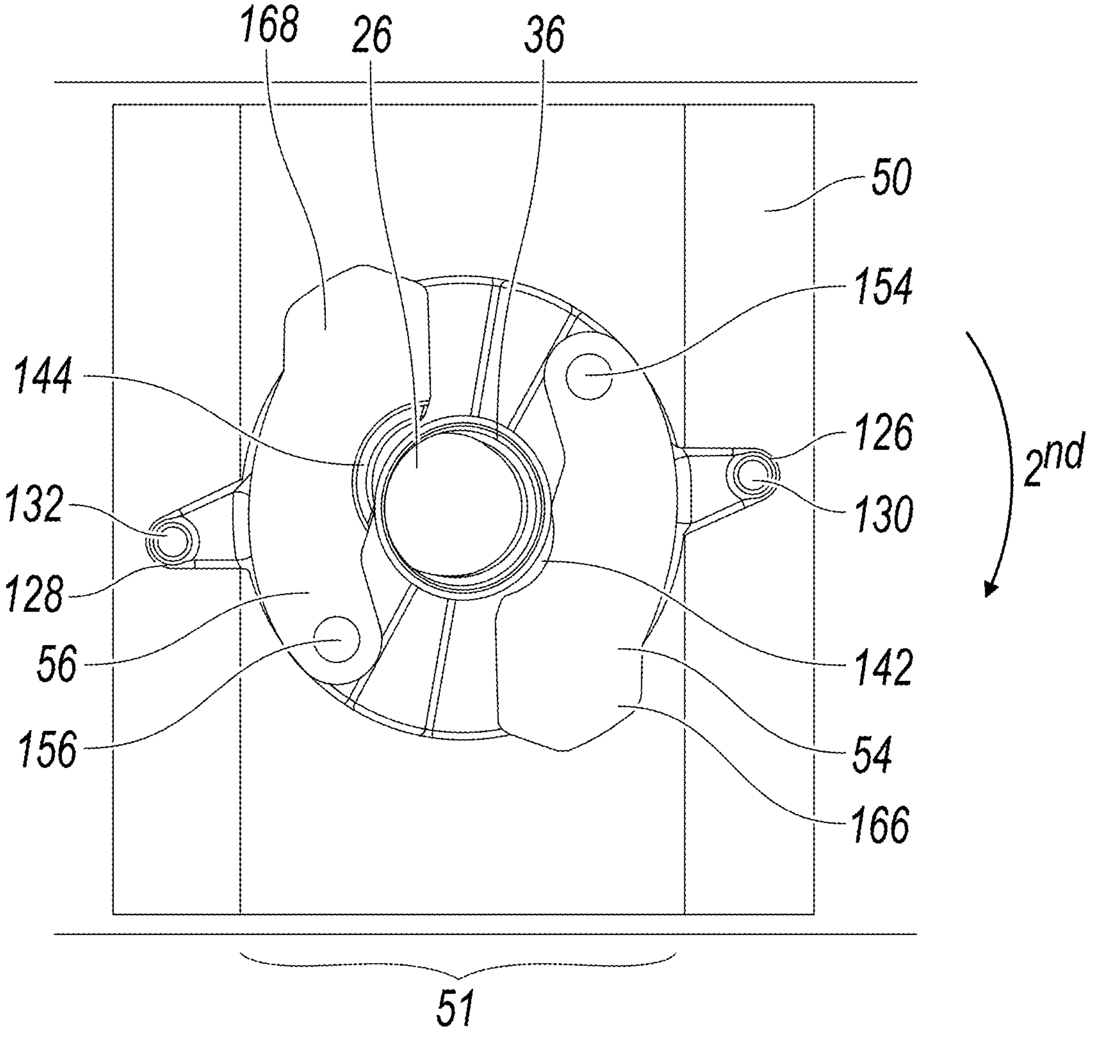
FIG. 20 is a plan view of the first embodiment of the threaded mechanism of the vise in the unthreaded mode.
Figure 23:
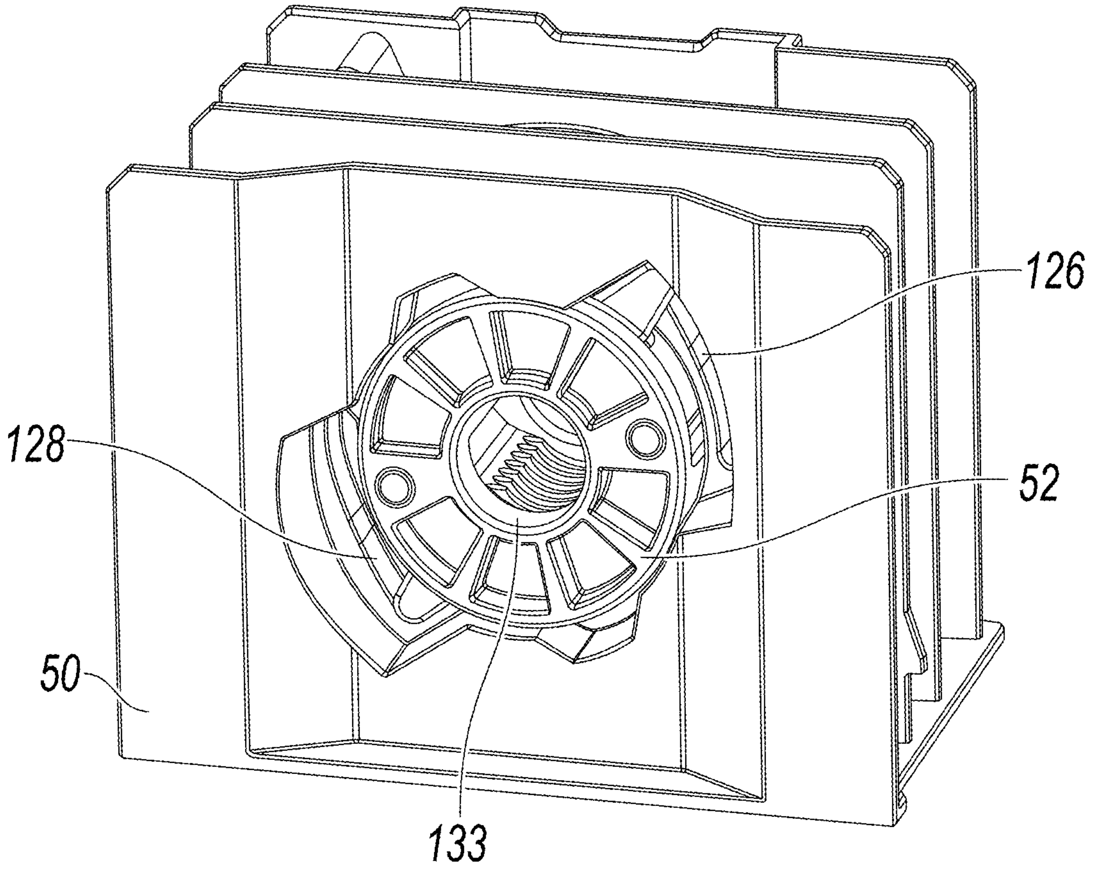
FIG. 23 is a perspective view of a second embodiment of the threaded mechanism showing the first embodiment of the jaw assembly disposed in a second embodiment of the housing.
Figure 24:
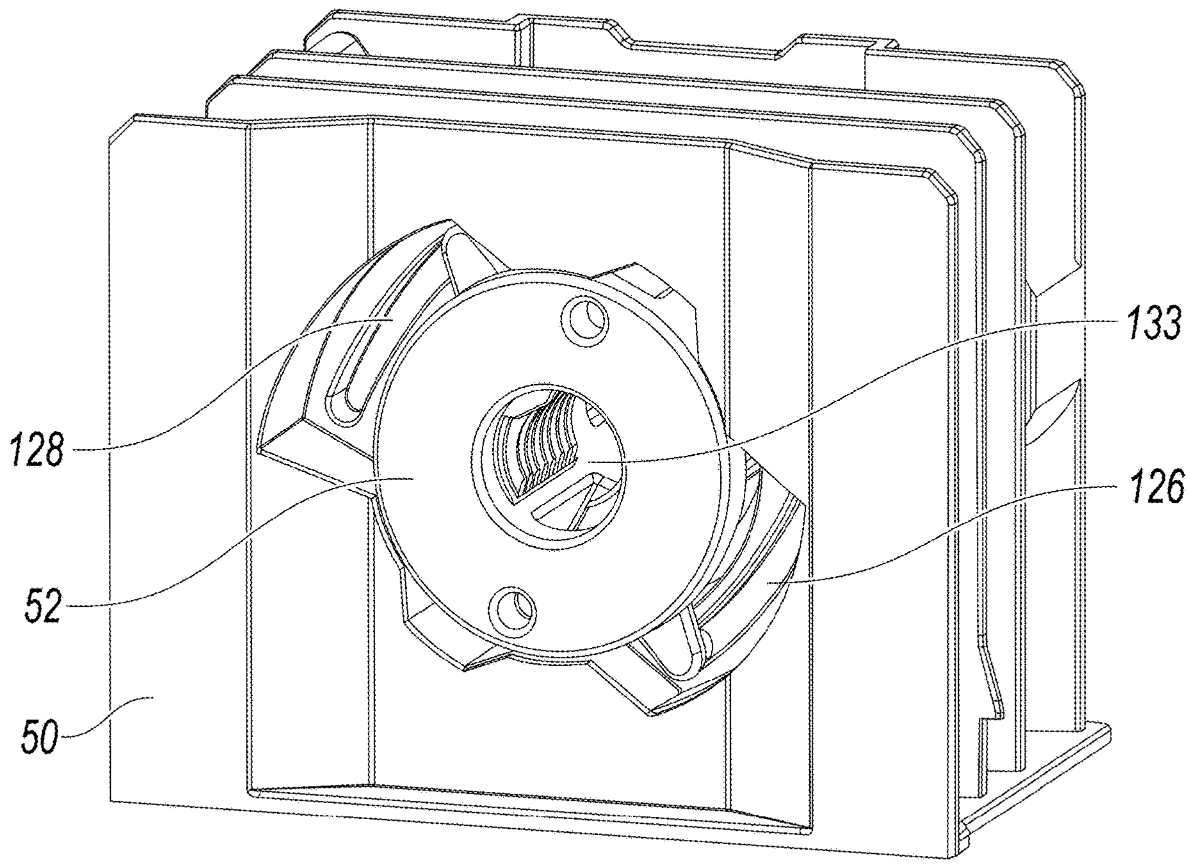
FIG. 24 is a perspective view of a third embodiment of the threaded mechanism showing the second embodiment of the jaw assembly disposed in the second embodiment of the housing.

Housing 50 defines an opening 49 into which is sized to receive the jaw cylinder subassembly 51. Opening 49 is generally cylindrical in shape. The housing 50 also defines first and second first and second prong cavities 126, 128. As expected, First and second prong cavities 126, 128 are configured to receive first and second prongs 130, 132, that are respectively attached to the first and second vise jaws 54, 56. In a first embodiment, as shown in FIGS. 19-20, the first and second prong cavities 126, 128 may be substantially cylindrical recesses. However, as shown in FIGS. 23 and 24, the first and second prong cavities 126, 128 may be arcuate grooves. The function of the first and second prong cavities will be discussed in greater detail below.

Figure 16:
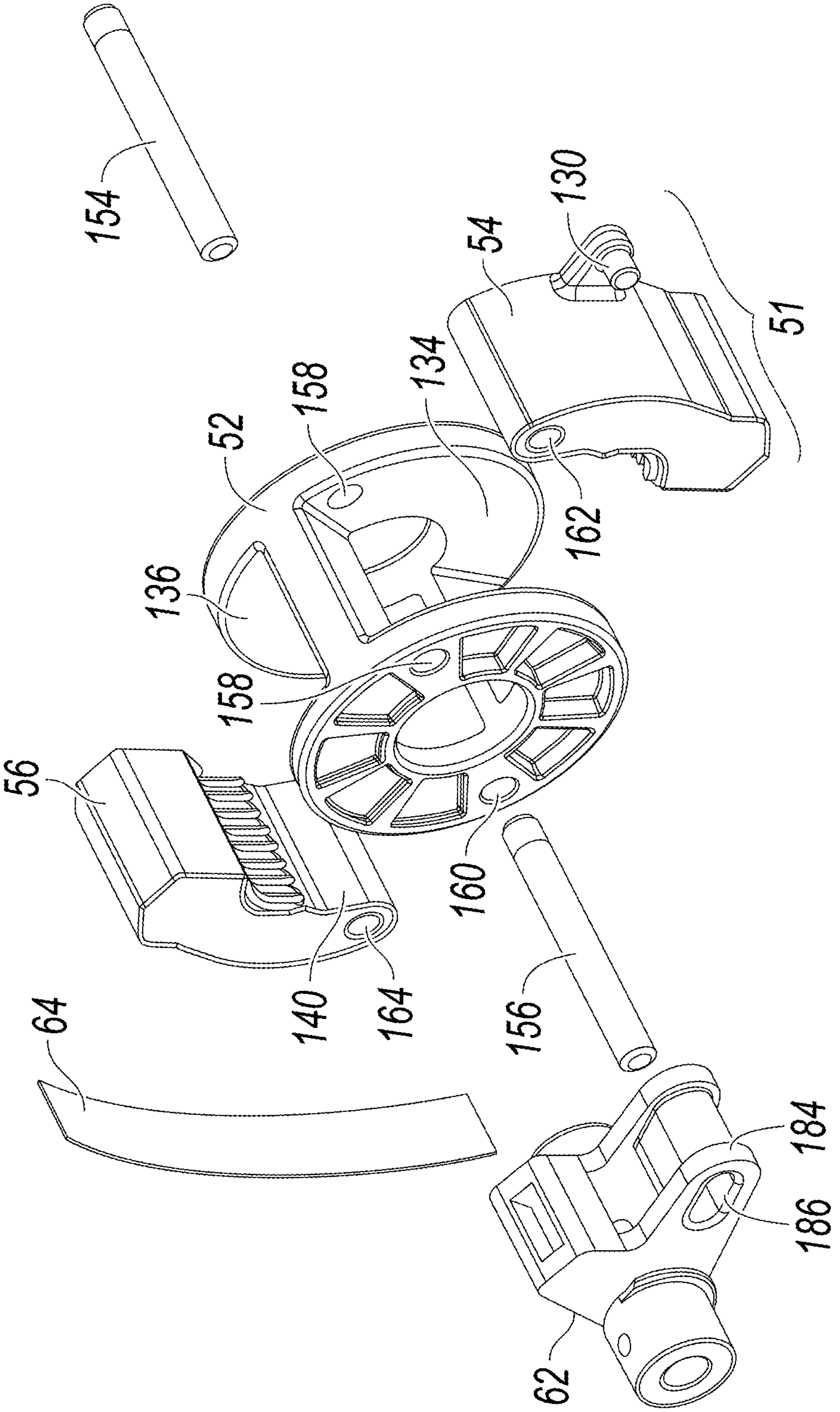
FIG. 16 is an exploded view of a first embodiment of a jaw assembly and the trigger and spring of the toggle assembly.
Figure 26:
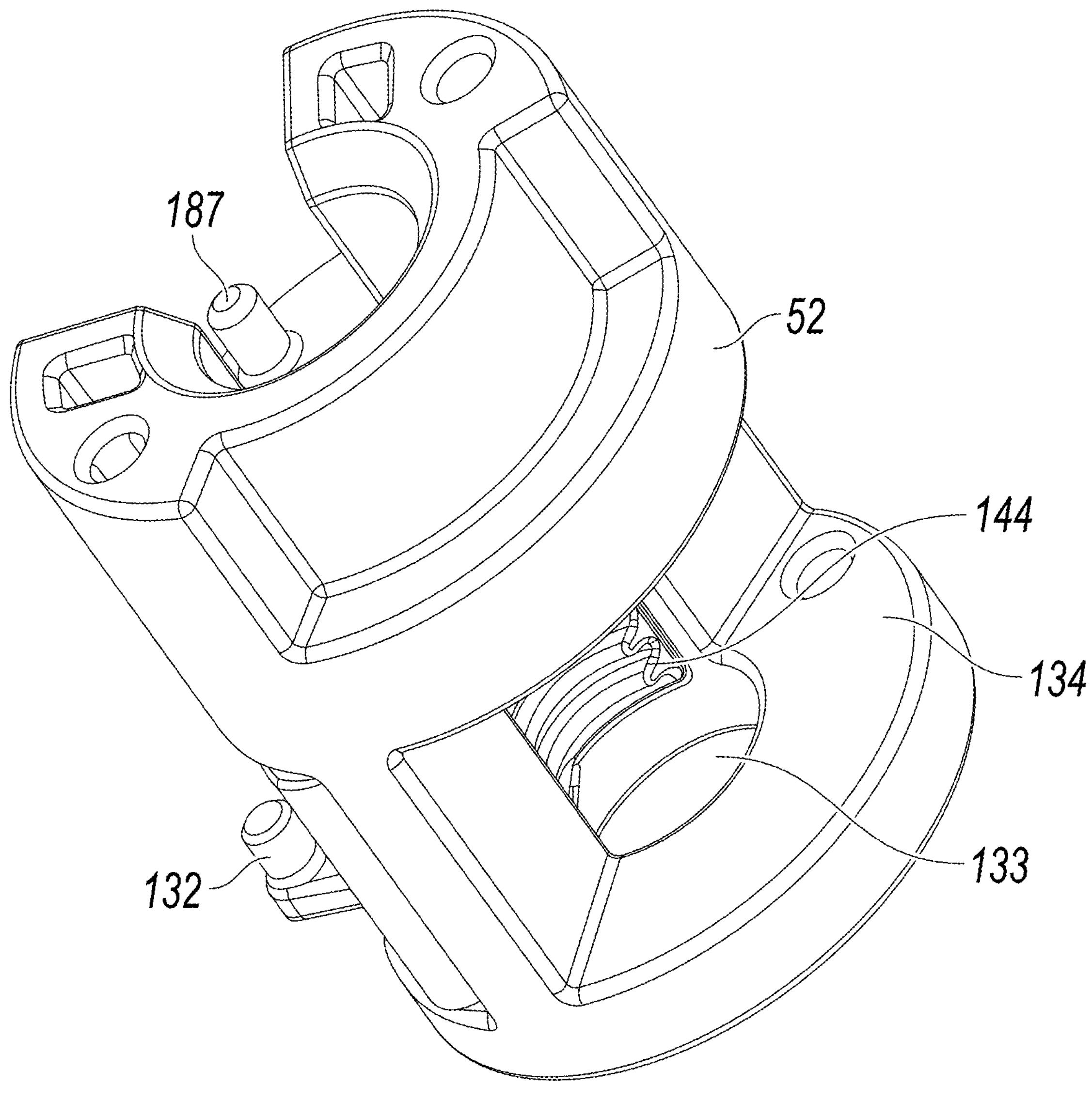
FIG. 26 is a perspective partial view of the second embodiment of the jaw assembly.
Figure 27:
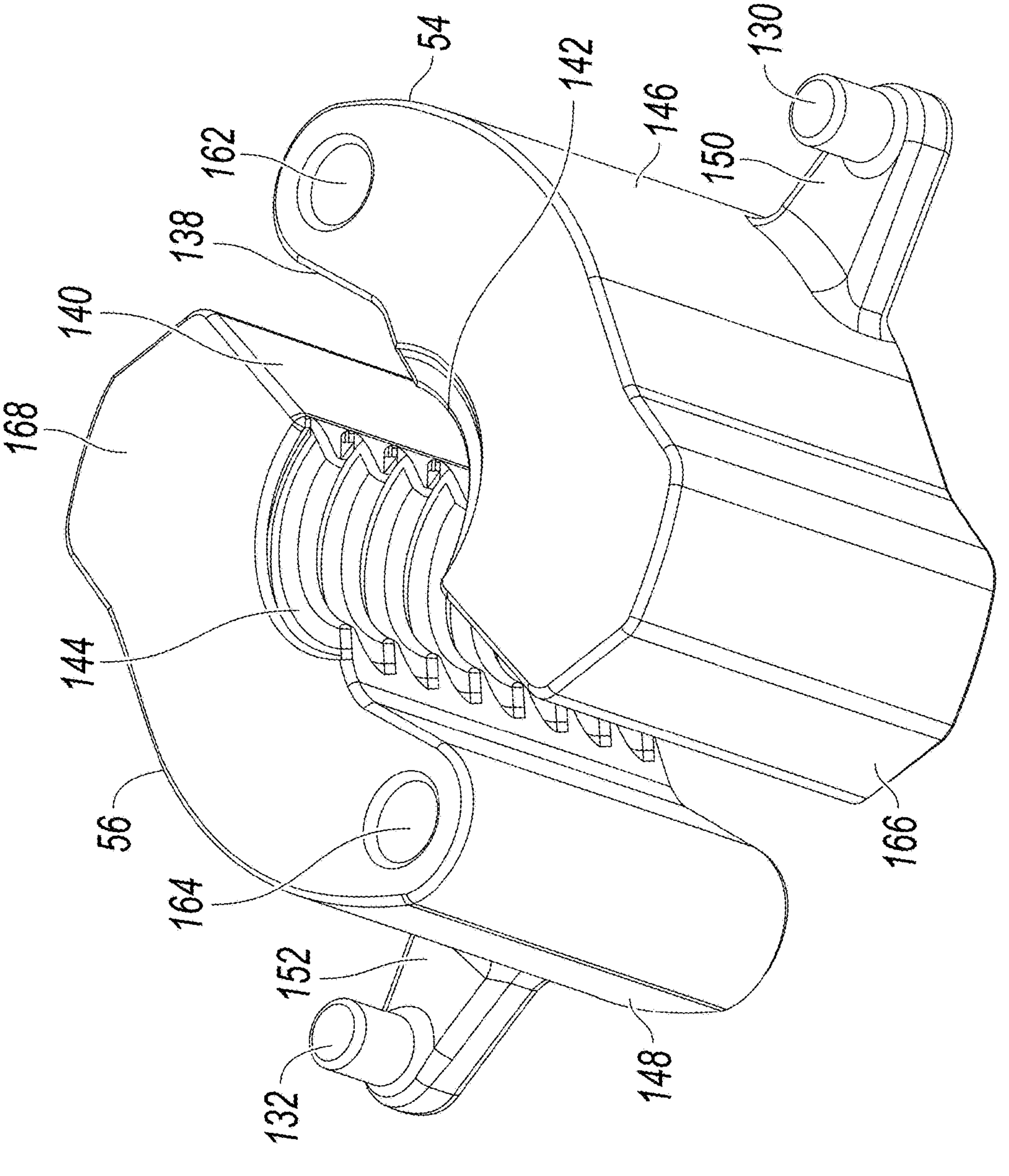
FIG. 27 is a perspective view of the first vise jaw and the second vise jaw.

As shown in FIG. 16, the jaw cylinder subassembly 51 of the threaded mechanism 30 consists of a jaw ring 52 and a first and second vise jaw 54, 56. The jaw ring 52 is substantially cylindrical in shape and defines a rod opening 133. Rod opening is configured to receive rod 26. More specifically, rod opening 133 is configured to receive the threaded portion 36 of rod 26. The jaw ring further includes a first carve out 134 and a second carve out 136. The first and second carve outs 134, 136 are sized to respectively receive the first and second vise jaws 54, 56. Additionally, the first and second carve outs 134, 136 are sized and shaped so that when the first and second vise jaws 54, 56 are at least partially disposed therein, there is space to allow the vise jaws 54, 56 to move radially. FIG. 26 shows an alternate embodiment of a jaw ring 52.

Each of the first and second vise jaws 54, 56 include an internal surface 138, 140. Internal surfaces 138, 140 further include threaded portions 142, 144. Threaded portions 142, 144 are arcuately shaped and configured to engage the threaded portion 36 of rod 26. When the threaded portions 142, 144 are engaged to the threaded portion 36 of rod 26, the rod may be moved axially through the jaw cylinder subassembly 51 in a screw-like fashion by applying rotational force to the rod.

Each of the first and second vise jaws 54, 56 further include an external surface 146, 148. External surfaces 146, 148 may also include a prong arm 150, 152. Prong arms 150, 152 extend radially away from the external surfaces 146, 148. Additionally, prong arms 150, 152 are configured to support prongs 130, 132.

In operation, the threaded mechanism 30 allows for the selective engagement/disengagement of the first and second vise jaws 54, 56 to the threaded portion 36 of the rod 26. The threaded portion 36 of the rod 26 is disposed within the threaded opening 133 of the jaw ring 52. The jaw cylinder subassembly 51 is then disposed within the housing 50. As discussed above, the jaw cylinder assembly 51 includes the first and second vise jaws 54, 56 at least partially disposed within the jaw ring 52. The jaw cylinder subassembly is then positioned within the housing 50 such that the prongs 130, 132 of the first and second vise jaws 54, 56 are respectively disposed within the first and second prong cavities 126, 128 of the housing 50. Once the jaw cylinder subassembly 51 and the threaded portion 36 of the rod 26 disposed within the housing, the selective engagement and disengagement of the first and second vise jaws 54, 56 to the threaded portion 36 of the rod 26 is achieved by partially rotating the jaw cylinder subassembly 51 within the housing.

In the embodiment shown in FIGS. 16-22, The rotation of the jaw cylinder subassembly 51 within the housing 51 can be achieved because prongs 130, 132 are fixed within the prong cavities 134, 136 of the housing 50, and each of the first and second vice jaws 54, 56 are pivotally positioned within the jaw ring 52. This pivotal positioning is obtained through a pair of dowels 154, 156. To accommodate the dowels 154, 156, the jaw ring 52 may further define two pairs of parallel openings 158, 160. Similarly, each of the first and second vise jaws 54, 56 may further define dowel openings 162, 164. As best seen in the exploded view of FIG. 16, the first dowel 154 is disposed in openings 158 of the jaw ring and dowel opening 54 of the first vise jaw 54. Likewise, the second dowel 156 is disposed in the openings 160 of the jaw ring 52 and the dowel opening 164 of the second vise jaw 56. With the dowels 154, 156 in position, and the prongs 130, 132 disposed within the prong cavities 126, 126 of the housing 50, each of the first and second vise jaws 54, 56 are pivotally held within the jaw cylinder subassembly 51.

Figure 21:
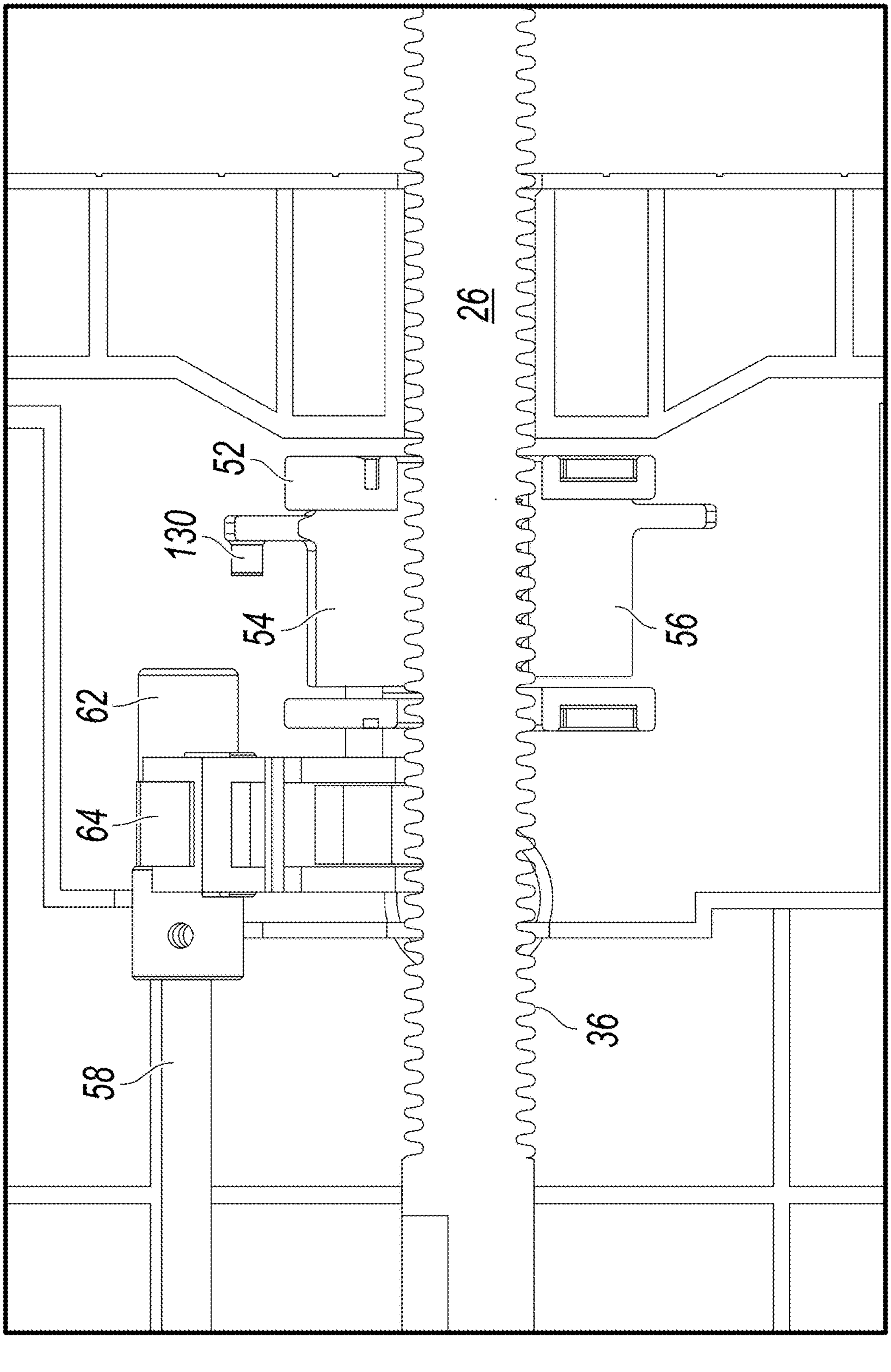
FIG. 21 is a cutaway view of the first embodiment of the threaded mechanism in the threaded mode.
Figure 22:
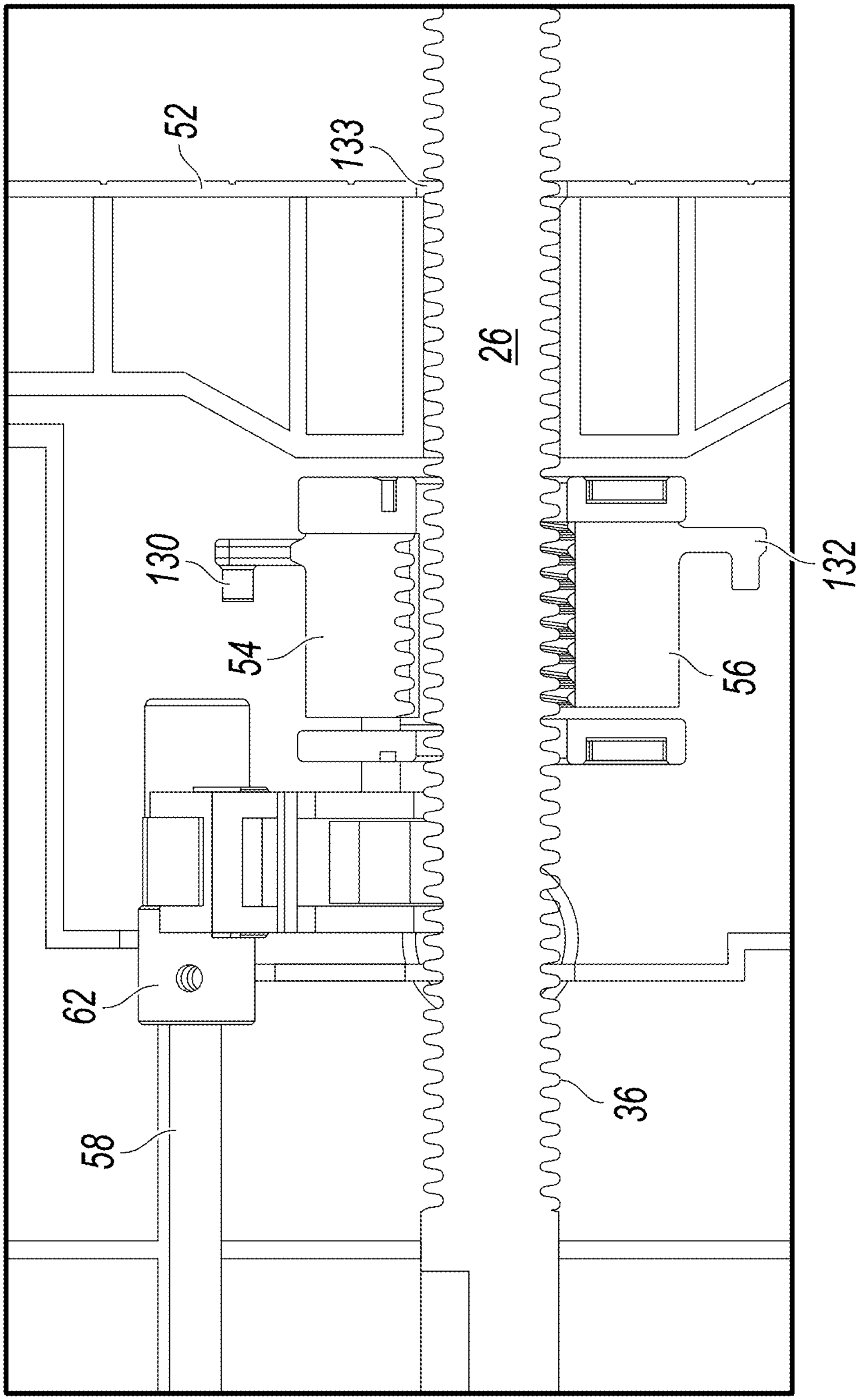
FIG. 22 is a cutaway view of the first embodiment of the threaded mechanism in the unthreaded mode.

FIGS. 19-22 show a various views a first embodiment of the threaded mechanism 30. FIGS. 19 and 21 show the threaded mode wherein the first and second vise jaws 54, 56 are in threaded engagement with the threaded portion 36 of the rod 26. In this mode, the threaded surfaces 142, 144 are engaged to the threaded portion 36 of rod 26. In this this position, the jaw cylinder subassembly 51 is partially rotated, in the second direction such that the respective free ends 166, 168 of the first and second vise jaws 54, 56 are rotated into the rod 26, such that the threaded surfaces 142, 144 are engaged with the threaded portion 36 of the rod 26. Conversely, as shown in FIGS. 20 and 22, which show the threaded mechanism 30 in the unthreaded mode, when the jaw cylinder subassembly 51 is rotated in the clockwise direction the jaw cylinder subassembly 51 has been partially rotated in the first direction such that the the respective free ends 166, 168 of the first and second vise jaws 54, 56 are rotated away from the rod 26. Thus, the threaded surfaces 142, 144 are disengaged from the threaded portion 36 of the rod 26.

Figure 25:
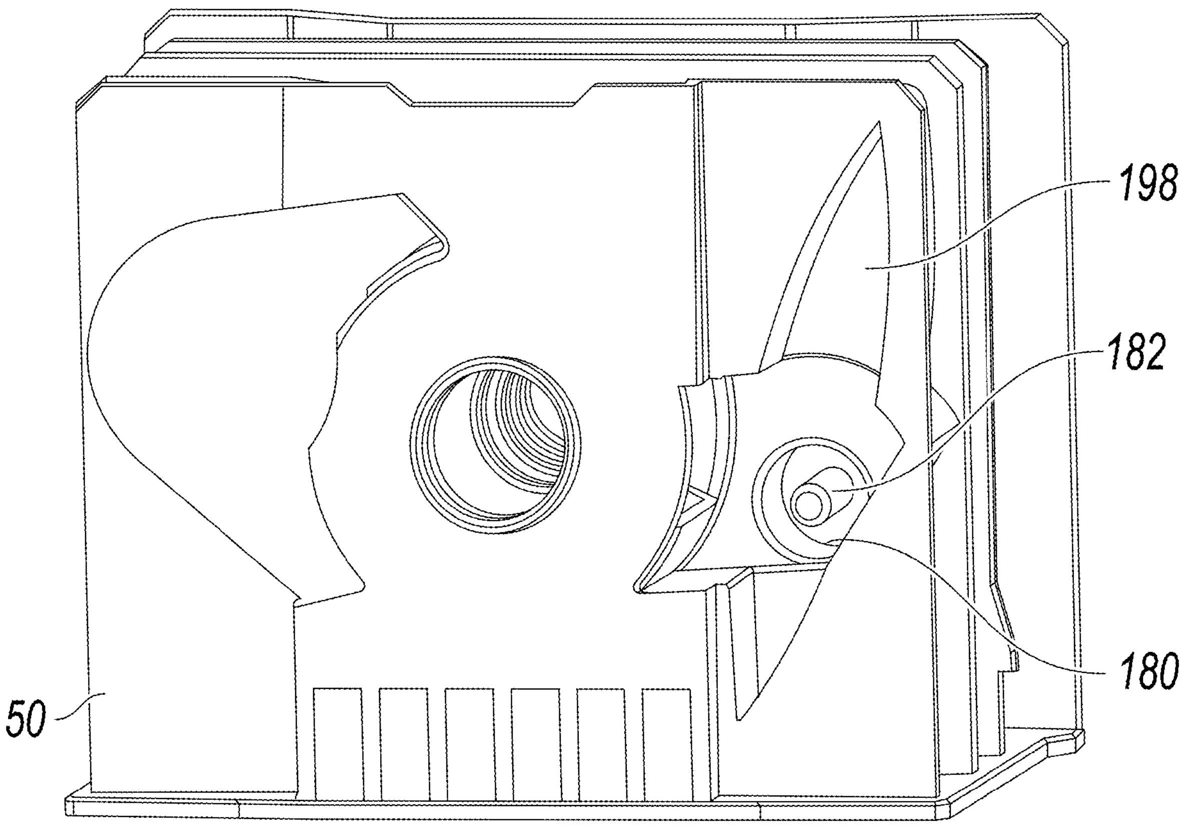
FIG. 25 is a perspective view of an alternate view of the threaded mechanism.

FIGS. 23-25 show an alternative embodiment of the threaded mechanism 30. In this alternate embodiment, the prong cavities 126, 128 of the housing 50 are not cylindrical recessions configured to receive prongs 130, 132 and fix them in a single position. Instead, the prong cavities 126, 128 of this alternate embodiment are grooves that allow the prongs 130, 132 to slide therein. More specifically, the prong cavities 126, 128 are spiral grooves. In this alternative embodiment, the threaded mechanism moves between the threaded mode and the unthreaded move by rotation of the jaw cylinder subassembly 51. However, in this embodiment, with the prongs 130, 132 disposed in the spiral grooves, as the jaw cylinder subassembly 51 is rotated, the respective entirety of the first and second vise jaws 54, 56 move into and out of contact with the rod 26.

Figure 28:
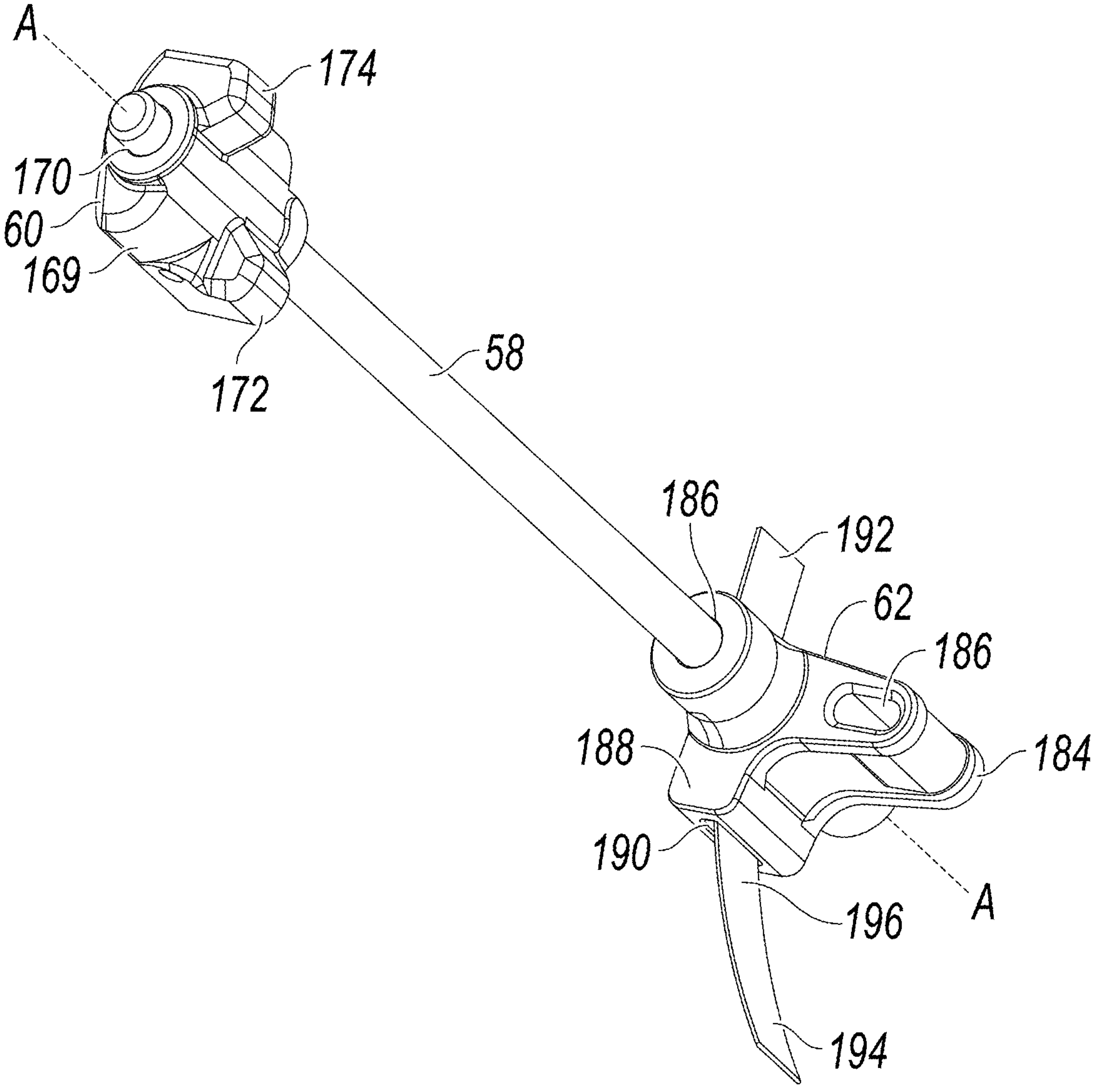
FIG. 28 is a perspective view of the toggle mechanism.

In addition to the ratchet mechanism 28 and the threaded mechanism 30, the vise mechanism 24 also includes a toggle mechanism 32. The toggle mechanism 32 connects the ratchet mechanism 28 to the threaded mechanism 30. Moreover, as the name implies, the toggle mechanism 32 toggles the vice mechanism 24 between the threaded mode and the unthreaded mode. As best seen in FIG. 28, the toggle mechanism includes a trigger 60, a switch rod 58, a switch 62 and a spring 64.

FIGS. 5-7 show how the toggle mechanism 32 engages the ratchet mechanism 28 and threaded mechanism 30. More specifically, these figures show how the toggle mechanism 32 engages the ratchet subassembly 41 and the jaw cylinder subassembly 51. The trigger 60 selectively engages with the ratchet subassembly 41, while the switch 62 and spring 64 engage with the jaw cylinder subassembly 51. The switch rod 58 mechanically connects the switch 62 and trigger 60.

Figure 30:
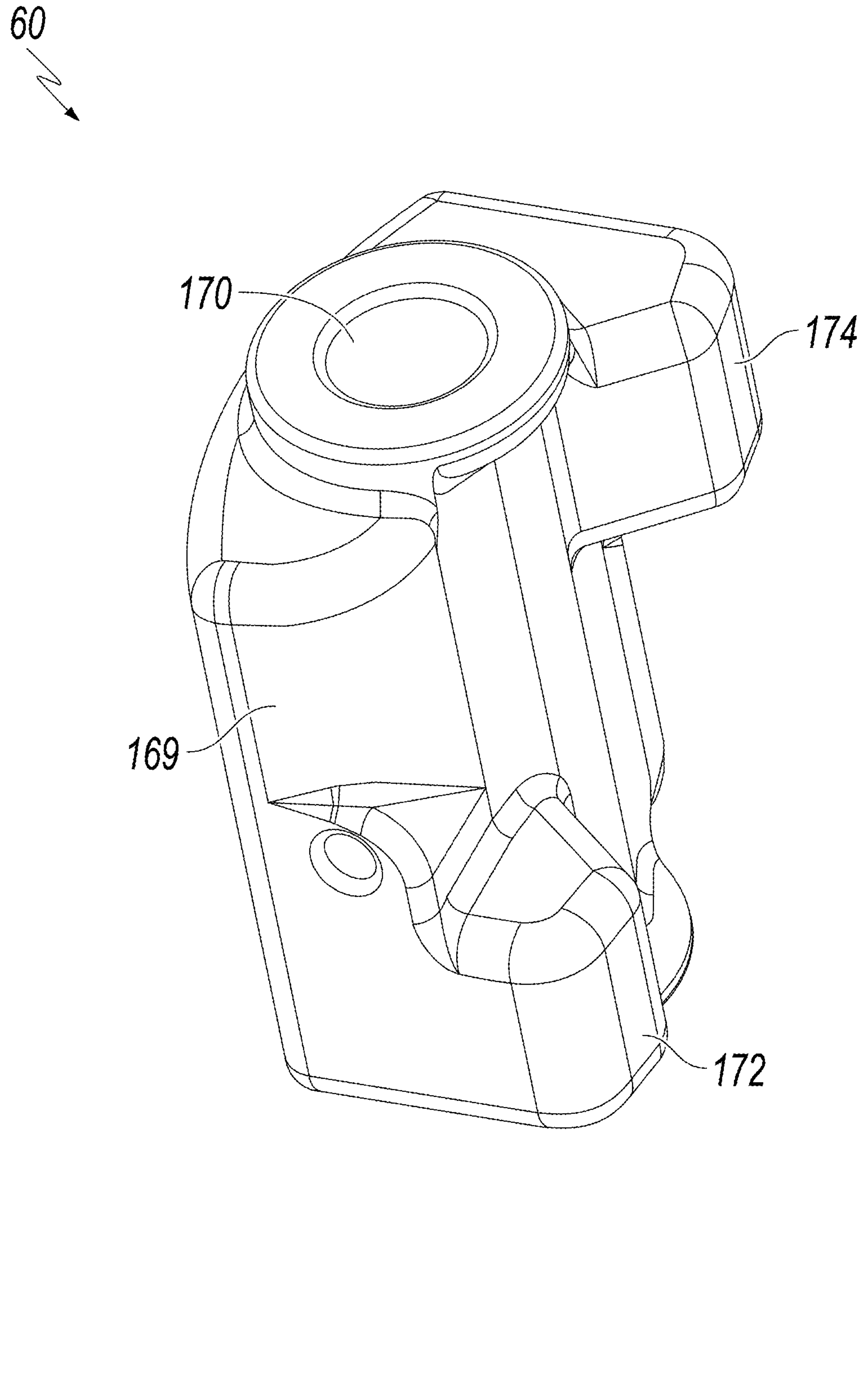
FIG. 30 is a perspective view of the trigger of the toggle mechanism.

As best seen in FIG. 30, the trigger includes a body 169 that defines an opening 170. Opening 170 is sized and configured to receive an end of the switch rod 58. Opening 170 is substantially circular and an imaginary Axis A runs therethrough. As shown in FIG. 28, Axis A runs the length of the switch rod 58. The body 169 further includes a proximal node 172 and a distal node 174. Trigger 60 is fixed to the switch rod 58 such that when the switch rod is rotated about Axis A, the trigger moves between a first position and a second position. In the first position, the distal node 174 is adjacent to the to the external surface 116 of the distal external ratchet ring 46 such that the at least one ramp 118 thereon can engage the distal node 174, and the proximal node 172 is spaced away from the external surface 100 of the proximal external ratchet ring 44 such that the at least one ramp 102 thereon cannot engage the proximal node 172. FIG. 5 shows the trigger 60 in the first position, which corresponds to the vise mechanism 24 being in the threaded mode.

In the second position, the distal node 174 is spaced away from the external surface 116 of the distal external ratchet ring 46 such that the at least one ramp 118 thereon cannot engage the distal node 174, and the proximal node 172 is adjacent to the external surface 100 of the proximal external ratchet ring 44 such that the at least one ramp 1102 thereon can engage the proximal node 172. FIG. 6 shows the trigger 60 in the second position, which corresponds to the vise mechanism being in the unthreaded mode.

Figure 29:
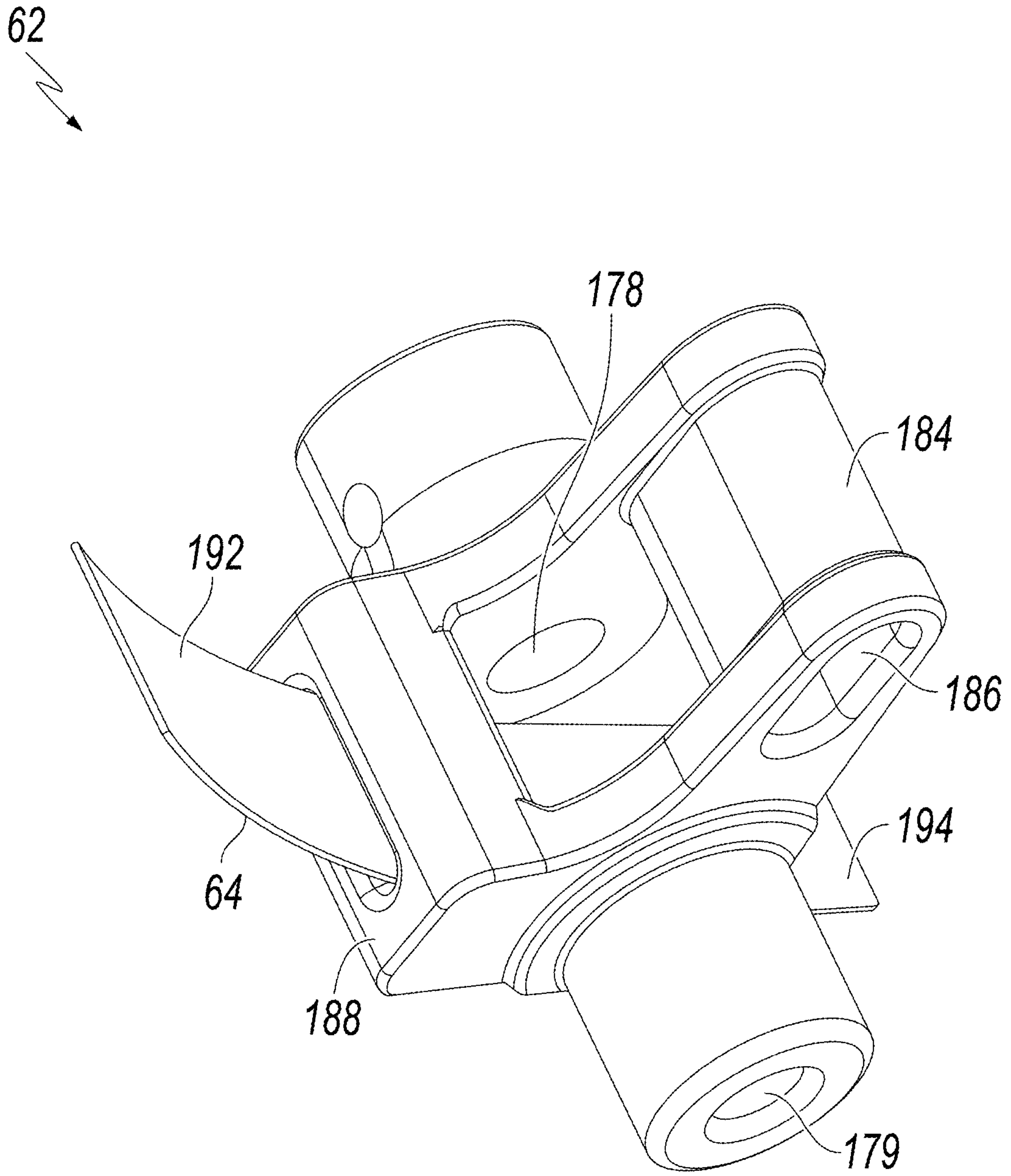
FIG. 29 is a perspective view of the switch and the spring of the toggle mechanism.

The toggle mechanism also includes a switch 62. As best seen in FIG. 29, the switch 69 includes a body 176. Body 176 defines a switch rod opening 178 that is sized and configured to receive an end of the switch rod 58. Body 176 also defines a second opening 179. Both the switch rod opening 178 and the second opening 179 are substantially circular and imaginary Axis A run therethrough. In operation, the switch 62 is at least partially disposed within the housing 50. As shown in FIG. 25, the housing 50 may include a switch cavity 180 having a switch prong 182 therein. The second opening 179 is sized to receive prong 182 and rotate thereon.

Figure 17:
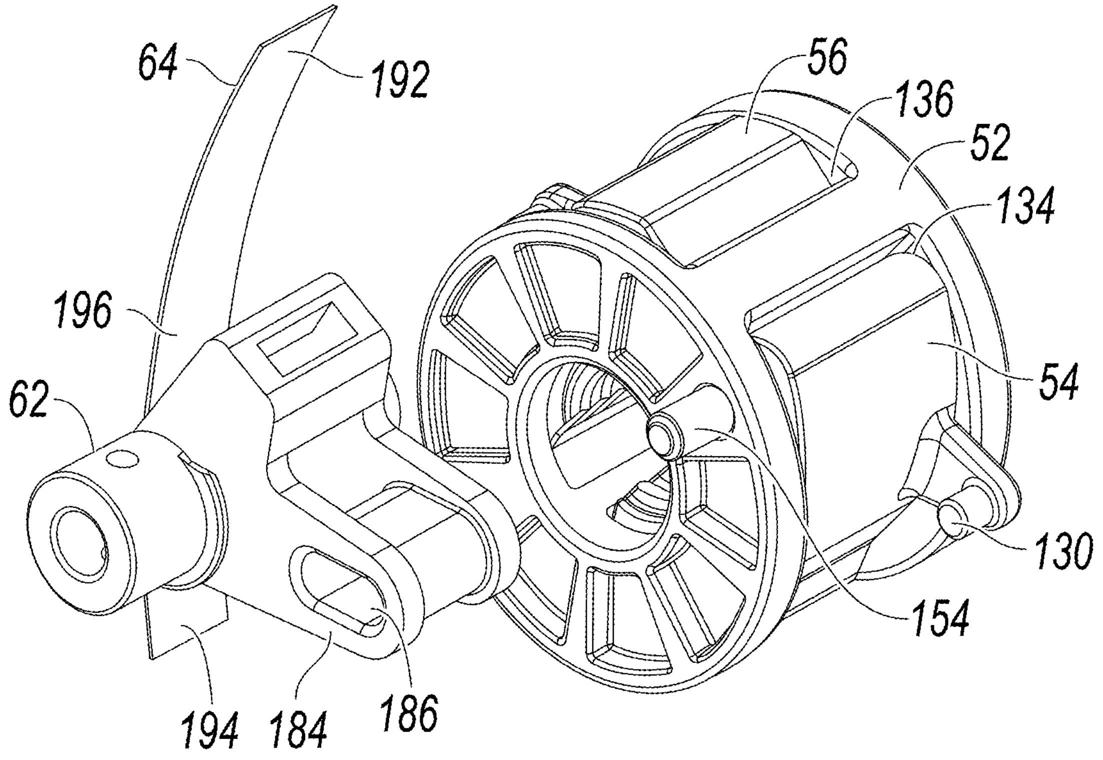
FIG. 17 is a perspective view of the first embodiment of the jaw assembly and the trigger and spring of the toggle assembly in the threaded mode.
Figure 18:
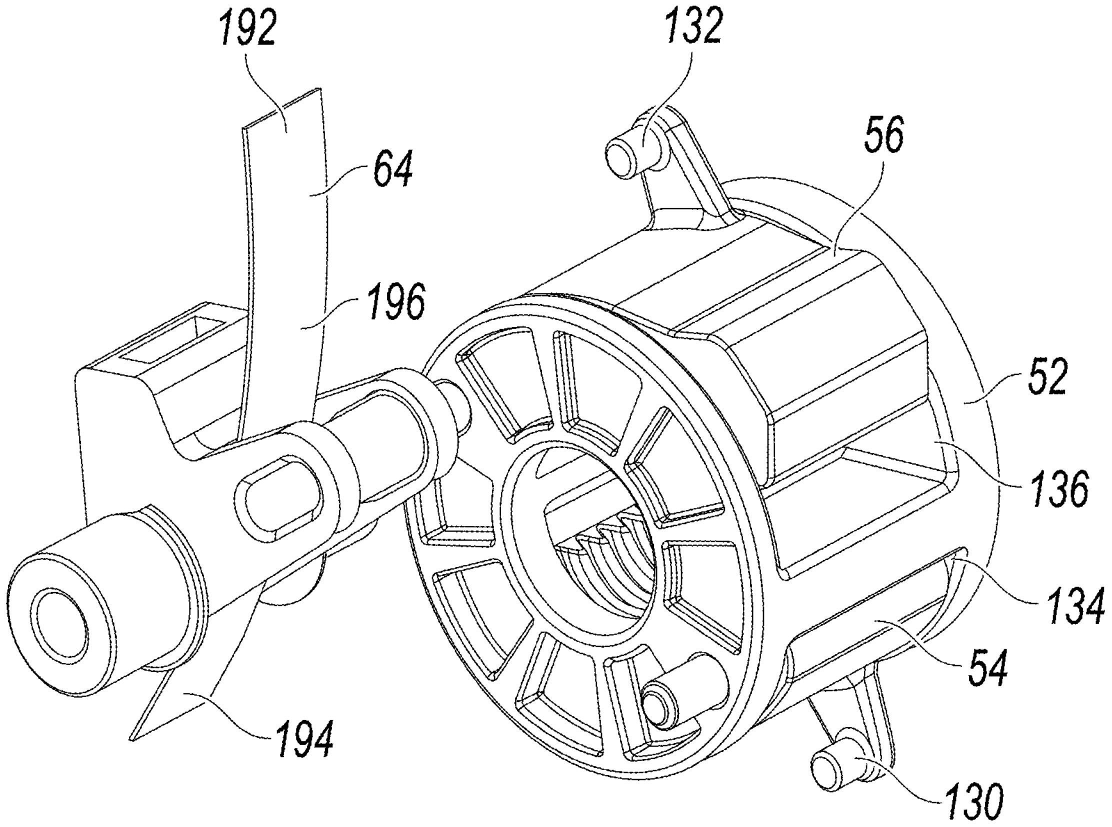
FIG. 18 is a perspective view of the first embodiment of the jaw assembly and the trigger and spring of the toggle assembly in the unthreaded mode.

Body 176 also includes a primary arm 184. Primary arm 184 is configured to engage the jaw cylinder subassembly 51. In one embodiment, as shown in FIGS. 16-18, the primary arm 184 defines a dowel opening 186. Dowel opening 186 is sized and configured to engage dowel 156. Those skilled in the art will recognize that other means of engaging the primary arm 184 to the jaw cylinder subassembly 51 are readily available. For example, the dowel opening 186 could engage dowel 187, which is a part of an alternate embodiment of a jaw ring 52. See FIGS. 7 and 26. In yet another alternate embodiment (not shown) the primary arm 184 could include a prong that engages a recess on the jaw cylinder subassembly.

Body 176 further includes a spring arm 188. Spring arm 188 defines a spring opening 190. Spring opening 190 is sized and shaped to received spring 64. As best seen in FIG. 4-7, spring 64 is a bowed planar spring having a first end 192, a second 194 and a center 196. Spring 64 may be made of a resilient metallic material that is biased toward a first bowed position. However, when the first end and the second end are fixed and force is applied to the center 196, the spring 64 will reach a critical angle (approximately 180 degrees) wherein the spring will invert and be biased toward a second bowed position. In operation, the spring 64 is also disposed within a spring cavity 198 defined by the housing 50. As shown in FIG. 25, spring cavity 198 is bow shaped and when spring 64 is disposed therein, the first end 192 and second end 194 are fixed in position. However, the center 196 of spring 64 is permitted to toggle between the first bowed position and the second bowed position. In operation, when the spring 64 is in its first bowed position, the trigger 60 and switch 62 are in their respective first positions. When this happens, the overall vise mechanism 24 is in the threaded mode. (See FIGS. 5 and 7). Conversely, when the spring 64 is in the second bowed position, the trigger 60 and switch 62 are in their respective second positions. When this happens, the overall vise mechanism 24 is in the unthreaded mode. (See FIG. 6)

INDUSTRIAL APPLICABILITY

We will now explain the operation of the vise 10 as it moves between the threaded and unthreaded modes. For ease of discussion, we will presume that the vise head 18 is in the closed position and the vise 10 is in the threaded mode. In this position and mode, an operator wishing to move the movable head 18 to an open position will rotate the force applicator 34 in the second direction. When the force applicator 34 is rotated in the second direction, the threaded portion 36 of the rod 26 will cause the movable head 18 to open a bit. However, as the operator continues to turn the force applicator 34 in the second direction, the vise 10 will move from the threaded mode to the unthreaded mode.

However, before we describe what happens as the vise moves from the threaded mode to the unthreaded mode, we must first describe the starting positions of the toggle mechanism and the threaded mechanism when the vise is in the threaded position. First, the trigger 62 of the toggle assembly 32 is rotated such that the proximal node 172 spaced away from the external surface 100 of the proximal external ratchet ring 44 such that ramp 102 cannot come into contact with proximal node. At the same time, the distal node 174 is rotated to be adjacent to the external surface of the distal external ratchet ring 46 such that ramp 118 can engage the proximal node. Second, when the vise is in the threaded mode, the spring 64 is biased into its first bowed position, which causes the switch 62 to rotate the jaw cylinder subassembly rotate into its first position, wherein the first and second vise jaws 54, 56 are in threaded engagement with the rod 26. See FIG. 5. Now that we understand where the critical elements are when the vise 10 is in the threaded mode, we can turn our attention to what happens when the vise moves from the threaded mode to the unthreaded mode.

Starting first with what happens within the ratchet mechanism 28, rotation of force applicator in the second direction 34 causes rod 26 and thus the inner ring 42 to rotate in the second direction. As the inner ring 42 rotates in the second direction, the prongs 96 of the proximal external ratchet ring 44 brush over the inclined surfaces 104 of ramps 102, and the proximal external ratchet ring remains substantially motionless. At the same time, rotation of the inner ring 42 in the second direction causes, the prongs 112 of the distal external ratchet ring 46 engage the stop faces 90 of ramps 86 on the distal portion 74 of the inner ring 42, and the distal external ratchet ring 46 rotates in the second direction. As the distal external ratchet ring rotates, ramp 118 will eventually come into contact with the distal node 174. As the distal node 174 moves up the inclined surface 120 of ramp 118, rotative force is applied to the trigger 60. This rotative force is increased as the distal node 174 moves up the inclined surface 120. This increased force will eventually overcome the biasing force holding the spring in its first bowed position. When this occurs, four things will happen nearly simultaneously: 1) the spring 64 will invert from its first bowed position into its second bowed position; 2) the trigger will rotate around Axis A from its first position into its second position; 3) the switch will rotate around Axis A from its first position into its second position; and 4) the jaw cylinder subassembly 51 will rotate from its first position into its second position, wherein the vise jaws 54, 56 are moved out of threaded engagement with the rod. This is the unthreaded position. See FIG. 6.

In the unthreaded position, an operator can freely slide the movable head 18 back and forth to obtain a desired position. Once the desired position is obtained, the operator may wish to clamp an object in the vise 10. In order to do this, it will be necessary to toggle the vise from the unthreaded mode back to the threaded mode. This process begins by rotating the force applicator in the first direction. Rotating the force applicator 34, in turn rotates the rod 26. The non-threaded portion 38 of the rod 26, which is disposed in the opening 43 of the inner ring 42 thus rotates the inner ring 42 in the first direction.

The rotation of the inner ring 42 in the first direction does not impart rotation to the distal external ratchet ring 46. This is due to the fact that the ramps 86 on the distal portion 74 of the inner ring 42 are inclined in the second circumferential direction. The prongs 112 of the distal external ratchet ring 46 are positioned such that the ends 114 brush over the inclined portions 88 of ramps 86 instead of engaging the stop faces 90. Thus, the distal external ratchet ring 46 remains substantially motionless as the inner ring rotates in the first direction.

However, rotation of the inner ring 42 in the first direction, does cause the proximal external ratchet ring 44 to rotate in the first direction. This is because the ramps 78 of the proximal portion 72 of the inner ring 42 are inclined in the first circumferential direction. Prongs 96 of the proximal external ratchet ring 44 are positioned such that when the inner ring 42 is rotated in the first direction, the stop faces 82 of ramps 78 engage the ends 98 of prongs 96. When this engagement occurs, the proximal external ratchet ring 44 rotates in the first direction along with the inner ring.

As the proximal external ratchet ring 44 rotates in the first direction, the ramp 102 on its external surface 100 also rotates. Eventually, this ramp will come into contact with the proximal node 172 of the trigger 60. As the proximal node 172 moves up the inclined surface 104 of ramp 102, rotative force is applied to the trigger 60. This rotative force is increased as the proximal node 172 moves up the inclined surface 104. This increased force will eventually overcome the biasing force holding the spring 64 in its second bowed position. When this occurs, four things will happen nearly simultaneously: 1) the spring 64 will invert from its second bowed position into its first bowed position; 2) the trigger will rotate around Axis A from its second position to its first position; 3) the switch will rotate around Axis A from its second position to its first position; and 4) the jaw cylinder subassembly will rotate from its second position to its first position, wherein the vise jaws 54, 56 are moved into threaded engagement with the threaded portion 36 of rod 26. This is the threaded mode. See FIG. 5.

In the threaded mode, the operator can rotate the force applicator in the first direction to provide fine movement of the movable head 18 as object 12 is clamped into position. See FIG. 1. Once the object 12 is clamped, continued rotation of the force applicator 34 in the first direction will impart increased clamping force.

In order to release the clamped object 12, the operator rotates the force applicator in the second direction. As discussed above, rotation of the force applicator 34 in the second direction consequently rotates the rod 26, inner ring 42 and distal external ratchet ring 46 in the second direction. Because the vise is in the threaded mode, rotation of the force applicator 34 in the second direction, will open the movable head slightly. This slight opening will allow the operator to remove the clamped object. In order to maintain this fine threaded control over the vise, the operator will have to take care not to turn the force applicator too far in the second direction such that the vise does not toggle into the unthreaded mode.

At this point, the operator may desire to clamp another object. If this second object is slightly thinner than the originally clamped object, the operator may simply put the second object in place and rotate the force applicator 34 in the first direction. As the vise 10 is still in the threaded mode, this rotation in the first direction will provide fine threaded movement of the movable head 18 as it closes into a clamping position on the second object.

Alternatively, if the operator is done with the vise or if the second object is either larger or substantially thinner than the original object, the operator will have to put the vise into its unthreaded mode in order to efficiently move the vise head into the desired position. In order to achieve this, the operator will rotate the force applicator in the second direction until the vise toggles into the unthreaded mode as described above.

While the present invention has been described in connection with what is considered the most practical and preferred embodiments, it is understood that this invention is not limited to the disclosed embodiments but is intended to cover various arrangement included within the spirit and scope of the broadest interpretation of the attached claims so as to encompass all such modifications and equivalent arrangements.

What is claimed is:

1. A vise comprising:

a fixed block;

a movable head movably attached to said fixed block;

a rod including a rod threaded portion and a rod non-threaded portion;

a ratchet secured to said fixed block and including a rotatable ring which jointly rotates with said rod, said rotatable ring including a rotatable ring opening and disposed on said rod with said non-threaded portion disposed through said rotatable ring opening, said rotatable ring rotatable in first and second opposite circumferential directions, said rotatable ring including a first rotatable portion having an external surface having a first rotatable portion ramp and a second rotatable portion having an external surface having a second rotatable portion ramp, said first rotatable portion ramp inclined outwardly in the first circumferential direction and said second rotatable portion ramp inclined outwardly in the second circumferential direction;

threaded portion engagement elements secured to said fixed block and selectively engageable with said rod threaded portion such that in a first condition said threaded portion engagement elements are engaged with said rod threaded portion and rotation of said rod causes said movable head to move relative to said fixed block and in a second condition said threaded portion engagement elements are disengaged from said rod threaded portion and said movable head is freely movable relative to said fixed block by sliding said movable head along said rod; and a toggle connected to said ratchet and said threaded portion engagement elements, said toggle comprising a switch rod and a trigger having a body defining an opening for receiving said switch rod, said trigger having a first node and a second node, said trigger configured to toggle between a first trigger position in which said first node can rotatably engage said first rotatable portion ramp and the second node is spaced from and cannot rotatably engage said second rotatable portion ramp and a second position in which the first node is spaced from and cannot rotatably engage said first rotatable portion ramp and the second node can rotatably engage the second rotatable portion ramp, wherein, rotation of said rotatable ring causes said toggle to move said threaded portion engagement elements between said first condition and said second condition.

2. The vise recited in claim 1, said rod attached to said fixed block in a manner which allows said rod to rotate relative to said fixed block, said movable head including a movable head opening and disposed on said rod with said rod disposed in said movable head opening, said vise further including a force applicator fixedly disposed on one end of said rod such that rotation of said force applicator causes said rod to rotate.

3. The vise recited in claim 2, said rod and said rotatable ring jointly rotatable in first and second opposite circumferential directions, wherein, when said threaded portion engagement elements are in the first condition and said rod and rotatable ring are jointly rotated in the first circumferential direction said threaded portion engagement elements remain engaged with said rod threaded portion for a defined extent of rotation of said rod and said rotatable ring in the first circumferential direction, and wherein after the joint rotation of said rod and said rotatable ring exceeds the defined extent of rotation, further rotation of said rod and rotatable ring in the first circumferential direction causes said toggle to move the threaded portion engagement elements to the second condition.

4. The vise recited in claim 1, further comprising, a threaded mechanism housing;

a jaw ring disposed within said threaded mechanism housing and having an opening receiving said rod threaded portion;

said threaded portion engagement elements comprising first and second jaws including an internally threaded surface;

wherein, when said jaw ring is rotated in the first circumferential direction said first jaw and said second jaw move into engagement with the threaded portion of the rod, and wherein when said jaw ring is rotated in the second circumferential direction, said first jaw and said second jaw are disengaged from the threaded portion of the rod.

5. A vise comprising:

a fixed block;

a movable head comprising a force applicator configured to be rotated by an operator;

a rod operatively coupled to the force applicator and configured to operatively couple the movable head to the fixed block, the rod comprising an unthreaded portion and a threaded portion, wherein the movable head can be moved relative to the fixed block in an unthreaded mode in which the operator can freely slide the movable head and the rod relative to the fixed block along the unthreaded portion or in a threaded mode in which the operator can move the movable head and the rod relative to the fixed block along the threaded portion by rotating the force applicator;

a rotatable ring disposed on and which jointly rotates with said rod, said rotatable ring rotatable in first and second opposite circumferential directions, said rotatable ring including a first rotatable portion having an external surface having a first rotatable portion ramp and a second rotatable portion having an external surface having a second rotatable portion ramp, said first rotatable portion ramp inclined outwardly in the first circumferential direction and said second rotatable portion ramp inclined outwardly in the second circumferential direction; and a toggle assembly operatively coupled to the rod, wherein the toggle assembly is configured to switch the vise from the unthreaded mode to the threaded mode during rotation of the force applicator in a first direction and is configured to switch the vice from the threaded mode to the unthreaded mode during rotation of the force applicator in a second direction opposite the first direction.

6. The vise of claim 5, wherein the unthreaded portion of the rod has a non-circular cross section.

7. The vise of claim 6, wherein the non-circular cross section is any one of cross shaped, I-shaped, triangular, quadrangular, or pentangular.

8. The vise of claim 5, wherein rotation of the force applicator in the first direction when the vise is in the threaded mode is configured to provide threaded movement of the movable head toward the fixed block.

9. The vise of claim 5, wherein the toggle assembly comprises a biasing mechanism having a first position, a second position, and a critical angle between the first and second positions, wherein the biasing mechanism is biased to one of the first position or the second position, and wherein the vise is in the threaded mode when the biasing mechanism is between the first position and the critical angle, and the vise is in the unthreaded mode when the biasing mechanism is between the second position and the critical angle.

10. The vise of claim 9, wherein rotation of the force applicator in the second direction when the vise is in the threaded mode causes the biasing mechanism to be rotated from the first position toward the critical angle and provides threaded movement of the movable head away from the fixed block until the biasing mechanism is rotated past the critical angle, causing the biasing mechanism to move to the second position, causing the toggle assembly to switch the vise from the threaded mode to the unthreaded mode.

11. The vise of claim 9, wherein rotation of the force applicator in the first direction when the vise is in the unthreaded mode causes the biasing mechanism to be rotated from the second position toward the critical angle until the biasing mechanism is rotated past the critical angle, causing the biasing mechanism to move to the first position, causing the toggle assembly to switch the vise from the unthreaded mode to the threaded mode.

12. The vise of claim 5, wherein the first direction is a clockwise direction, and the second direction is a counter-clockwise direction.

13. A vise comprising: a fixed block;

a movable head comprising a force applicator configured to be rotated by an operator;

a rod operatively coupled to the force applicator and configured to operatively couple the movable head to the fixed block, the rod comprising an unthreaded portion and a threaded portion, wherein the movable head can be moved relative to the fixed block in an unthreaded mode in which the operator can freely slide the movable head and the rod relative to the fixed block along the unthreaded portion or in a threaded mode in which the operator can move the movable head and the rod relative to the fixed block along the threaded portion by rotating the force applicator; and a toggle assembly secured to the fixed block and comprising a ratchet portion operatively coupled to the unthreaded portion of the rod comprising:

a first ratchet comprising a first inner ring configured to jointly rotate with the rod in a first direction and a second direction, and a first external surface provided with one or more first ramp features inclined outwardly in the first direction, where in the first inner ring is only configured to rotate the first external surface when the rod is rotated in the second direction; and a second ratchet comprising a second inner ring configured to jointly rotate with the rod in the first and second directions and a second external surface provided with one or more second ramp features inclined outwardly in the second direction, wherein the second inner ring is only configured to rotate the second external surface when the rod is rotated in the first direction, and a toggle assembly threaded portion selectively couplable to the threaded portion of the rod;

wherein the toggle assembly is configured to switch the vise from the unthreaded mode to the threaded mode during rotation of the force applicator in the first direction and is configured to switch the vice from the threaded mode to the unthreaded mode during rotation of the force applicator in the second direction opposite the first direction.

14. The vise of claim 13, wherein the toggle assembly threaded portion comprises a first threaded component and a second threaded component, wherein the first and second threaded components are configured to operatively couple to the threaded portion of the rod when the rod is in the threaded mode.

15. The vise of claim 13, wherein the toggle assembly further comprises a biasing mechanism having a first position, a second position and a critical angle between the first and second positions, wherein the biasing mechanism is biased to one of the first position or the second position, and wherein the vise is in the threaded mode when the biasing mechanism is between the first position and the critical angle, and the vise is in the unthreaded mode when the biasing mechanism is between the second position and the critical angle.

16. The vise of claim 15, wherein rotation of the force applicator in the second direction when the vise is in the threaded mode causes the first ratchet to move the biasing mechanism from the first position toward the critical angle and provides threaded movement of the movable head away from the fixed block until the biasing mechanism is rotated past the critical angle, causing the biasing mechanism to move to the second position, causing the toggle assembly to switch the vise from the threaded mode to the unthreaded mode.

17. The vise of claim 15, wherein rotation of the force applicator in the first direction when the vise is in the unthreaded mode causes the second ratchet to move the biasing mechanism from the second position toward the critical angle until the biasing mechanism is rotated past the critical angle, causing the biasing mechanism to move to the first position, causing the toggle assembly to switch the vise from the unthreaded mode to the threaded mode.

18. The vise of claim 13, wherein the unthreaded portion of the rod has a cross section that is any one of cross shaped, I-shaped, triangular, quadrangular, or pentangular.

* * * * *